(12) United States Patent
Egawa et al.

(10) Patent No.: US 9,771,051 B2
(45) Date of Patent: Sep. 26, 2017

(54) SEATBELT RETRACTOR

(75) Inventors: Shuzo Egawa, Osaka (JP); Young Jae Kang, Osaka (JP); Takayoshi Ijiri, Osaka (JP)

(73) Assignee: ASHIMORI INDUSTRY CO., LTD., Osaka (JP)

( * ) Notice: Subject to any disclaimer, the term of this patent is extended or adjusted under 35 U.S.C. 154(b) by 204 days.

(21) Appl. No.: 14/123,292

(22) PCT Filed: May 17, 2012

(86) PCT No.: PCT/JP2012/062581
§ 371 (c)(1),
(2), (4) Date: Dec. 2, 2013

(87) PCT Pub. No.: WO2012/169327
PCT Pub. Date: Dec. 13, 2012

(65) Prior Publication Data
US 2014/0117138 A1    May 1, 2014

(30) Foreign Application Priority Data
Jun. 7, 2011  (JP) ................................ 2011-127172

(51) Int. Cl.
*B60R 22/40*      (2006.01)
*B60R 22/405*     (2006.01)
*B60R 22/34*      (2006.01)

(52) U.S. Cl.
CPC ............ *B60R 22/40* (2013.01); *B60R 22/405* (2013.01); *B60R 2022/3402* (2013.01)

(58) Field of Classification Search
CPC ....... B60R 22/40; B60R 22/41; B60R 22/405; B60R 2022/3402
See application file for complete search history.

(56) References Cited

U.S. PATENT DOCUMENTS 4,506,844 A * 3/1985 Ernst ................... B60R 22/405
                                           242/376.1
5,480,105 A * 1/1996 Fujimura et al. ......... 242/383.2
(Continued)

FOREIGN PATENT DOCUMENTS

EP     1 880 909 A1    1/2008
GB     2 254 774 A    10/1992
(Continued)

OTHER PUBLICATIONS

International Search Report issued in International Patent Application No. PCT/JP2012/062581 dated Aug. 7, 2012 (with translation).
(Continued)

*Primary Examiner* — Sang Kim
(74) *Attorney, Agent, or Firm* — Oliff PLC

(57) ABSTRACT

An engagement-side flange portion, one of a pair of flange portions on the respective axial ends of a webbing-take-up portion of a take-up drum, is positioned to face engagement teeth and includes a projecting portion formed to project radially outward from its peripheral edge that faces a pawl when the pawl moves to reach engagement position with the engagement teeth. Outer peripheral diameter of engagement-side flange portion is smaller than inner peripheral diameter defined with tip ends of engagement teeth. Maximum outer peripheral dimension formed by the projecting portion and engagement-side flange portion is larger than inner peripheral diameter defined with tip ends of engagement teeth. In a state where the take-up drum is attached to a housing, the projecting portion projects radially outward over inner peripheral diameter defined with tip ends of engagement teeth that is located at axially outward side of the projecting portion.

1 Claim, 27 Drawing Sheets

(56) References Cited

U.S. PATENT DOCUMENTS

| | | | | |
|---|---|---|---|---|
| 5,772,144 A * | 6/1998 | Tanabe et al. | ............ | 242/379.1 |
| 5,826,813 A * | 10/1998 | Hibata | ............ | B60R 22/415 |
| | | | | 242/382.6 |
| 6,354,528 B1 * | 3/2002 | Nagata et al. | ............ | 242/374 |
| 6,443,382 B1 * | 9/2002 | Bae | ............ | 242/382.6 |
| 7,290,730 B2 * | 11/2007 | Nagata | ............ | B60R 22/4633 |
| | | | | 242/374 |
| 7,621,478 B2 * | 11/2009 | Sumiyashiki | ............ | B60R 22/41 |
| | | | | 242/383 |
| 8,662,538 B2 * | 3/2014 | Specht | ............ | B60R 22/41 |
| | | | | 242/383.1 |
| 8,708,269 B2 * | 4/2014 | Saito | ............ | B60R 22/40 |
| | | | | 242/374 |
| 8,925,850 B2 * | 1/2015 | Tatsuma | ............ | B60R 22/41 |
| | | | | 242/383.1 |
| 8,950,819 B2 * | 2/2015 | Yoshioka | ............ | B60R 22/36 |
| | | | | 297/479 |
| 2001/0023904 A1 * | 9/2001 | Kanamori | ............ | B60R 22/3413 |
| | | | | 242/379.1 |
| 2005/0224623 A1 * | 10/2005 | Sumiyashiki | ............ | B60R 22/41 |
| | | | | 242/384.2 |
| 2007/0051840 A1 * | 3/2007 | Hiramatsu | ............ | B60R 22/4676 |
| | | | | 242/374 |
| 2008/0029634 A1 * | 2/2008 | Kim et al. | ............ | 242/383.4 |
| 2009/0057466 A1 * | 3/2009 | Choi et al. | ............ | 242/377 |
| 2009/0057471 A1 * | 3/2009 | Hiramatsu et al. | ............ | 242/396.1 |
| 2012/0153066 A1 * | 6/2012 | Takamatsu et al. | ............ | 242/382 |
| 2012/0248847 A1 * | 10/2012 | Shiotani et al. | ............ | 297/479 |

FOREIGN PATENT DOCUMENTS

| | | |
|---|---|---|
| JP | H06-87107 U | 12/1994 |
| JP | A-7-144605 | 6/1995 |
| JP | A-2001-233172 | 8/2001 |
| JP | A-2007-69686 | 3/2007 |
| JP | A-2007-126148 | 5/2007 |

OTHER PUBLICATIONS

Oct. 30, 2014 Extended European Search Report issued in European Application No. 12797487.1.

* cited by examiner

SEATBELT RETRACTOR

TECHNICAL FIELD

The present invention relates to a seatbelt retractor which prevents a webbing from being drawn out in case of an emergency.

BACKGROUND ART

Conventionally, there have been proposed various types of seatbelt retractors which prevent a webbing from being drawn out in case of an emergency.

For instance, in a conventional seatbelt retractor, a U-shaped frame 2 has right and left side walls 2a and 2b with through holes 2d and 2e provided therein, respectively. The right and left side walls 2a and 2b have V-shaped teeth 2f and 2g formed on entire inner peripheries thereof, respectively. Between the right and left side walls 2a and 2b, a reel shaft 4 is arranged for taking up a webbing 3.

The reel shaft 4 has a webbing take-up portion 4a. The webbing take-up portion 4a has circular guide flange portions 4b and 4c formed at both the right and left ends thereof. On outer peripheral portions of the guide flange portions 4b and 4c, arc-like slip-off prevention flanges 4m and 4r are formed. The maximum diameter of outer peripheries formed by the guide flange portions 4b and 4c and the slip-off prevention flanges 4m and 4r is set slightly smaller than the inner peripheral diameter defined by the tips of teeth 2f and 2g, so that the guide flange portions 4b and 4c including the slip-off prevention flanges 4m and 4r is passable through the through holes 2d and 2e, respectively.

The guide flange portions 4b and 4c rotatably support a main pawl 17 and a back-up pawl 20, respectively, on the side opposite to the slip-off prevention flanges 4m and 4r, with regard to the center thereof. The main pawl 17 and the back-up pawl 20 are configured to respectively engage with the teeth 2f and 2g if needed, to prevent rotation of the reel shaft 4 in a webbing pull-out direction. Web-like large misalignment preventing flanges 17g and 20g are formed between the teeth 17d of the main pawl 17 and between the teeth 20d of the back-up pawl 20, on the reel shaft 4 side. The teeth 17d and the teeth 20d are configured to engage with the teeth 2f and 2g, respectively.

The slip-off prevention flanges 4m and 4r face the teeth 2f and 2g, respectively, under a state where the center of each of the through holes 2d and 2e is in line with the center axis of the reel shaft 4 after passing the reel shaft 4 through the through holes 2d and 2e. The large misalignment preventing flanges 17g and 20g are configured to make contact with the insides of the teeth 2f and 2g when the teeth 17d of the main pawl 17 and the teeth 20d of the back-up pawl 20 engage with the teeth 2f and 2g, respectively (See, for instance, Japanese Laid-open Patent Application Publication No. 7-144605).

DISCLOSURE OF THE INVENTION

Problem to be Solved by the Invention

In the above-described conventional seatbelt retractor, however, if the back-up pawl 20 is omitted in order to reduce the number of components, only the main pawl 17 is attached to the reel shaft 4. In such a case, when the webbing 3 is prevented from being pulled out in case of an emergency such as vehicle collision, only the main pawl 17 shoulders a load from the webbing 3 in diagonal direction with respect to the rotational axis of the reel shaft 4.

As a result, the main pawl 17 has to shoulder the load in axial direction including the load the back-up pawl 20 would have shouldered. Accordingly, the large misalignment preventing flange 17g may be deformed and the rotation supporting portion of the main pawl 17 at the guide flange 4b may also be deformed, causing the large misalignment of the main pawl 17 in the axial direction from the teeth 2f of the frame 2.

Further, the height of the slip-off prevention flange 4m projecting from the guide flange 4b needs to be lowered so as to enable the reel shaft 4 to pass through the through holes 2d and 2e. Accordingly, if the rigidity of the frame 2 is sacrificed for such a purpose as weight reduction, axial misalignment may occur in the slip-off prevention flange 4m due to deformation of the frame 2 in an emergency such as vehicle collision. As a result, the load of the main pawl 17 in the axial direction on the large misalignment preventing flange 17g further increases, and the large misalignment preventing flange 17g may be deformed and the rotation supporting portion of the main pawl 17 at the guide flange 4b may also be deformed, causing the large misalignment of the main pawl 17 in the axial direction from the teeth 2f of the frame 2.

The present invention has been made in view of the above-described problems and an object thereof is to provide a seatbelt retractor capable of preventing large misalignment of a pawl in axial direction from an engagement position to engage with engagement teeth in case of an emergency such as vehicle collision, and also capable of reducing the weight and the number of components.

To achieve the object of the present invention, there is provided a seatbelt retractor comprising: a take-up drum configured to take up and store a webbing; a housing having a pair of side wall portions which face each other, the pair of side wall portions consisting of a one-side wall portion and the other-side wall portion each of which having a through hole configured to allow insertion of the take-up-drum and rotatably hold the take-up drum; and a locking means arranged between the take-up drum and a through hole at the one-side wall portion, the locking means normally allowing the take-up drum to rotate, and getting activated when needed so as to stop the take-up drum from rotating in a webbing-pull-out direction, wherein the take-up drum comprises: a webbing take-up portion; and a pair of flange portions provided at axis directional both ends of the webbing-take-up portion, one of which positioned at the one-side wall portion of the housing being an engagement-side flange portion, wherein the locking means comprises: engagement teeth formed on inner periphery of the through hole at the one-side wall portion; and a pawl mounted on the engagement-side flange portion that faces the engagement teeth, the pawl normally being set at a disengagement position so as to be disengaged from the engagement teeth and brought to an engagement position so as to get engaged with the engagement teeth when needed, wherein the engagement-side flange portion comprises a projecting portion formed so as to project radially outward from a peripheral edge thereof, opposing to the pawl at the engagement position, wherein outer peripheral diameter of the engagement-side flange portion is set smaller than an inner peripheral diameter defined with tip ends of the engagement teeth and maximum outer peripheral dimension formed by the projecting portion and the engagement-side flange portion is set larger than the inner peripheral diameter defined with tip ends of the engagement teeth, and wherein, in a state where center axis of the through hole at the one side wall portion and rotation axis of the take-up drum align, an axially outer surface of the projecting portion faces the engagement teeth and the projecting portion projects radially outward over the inner peripheral diameter defined with tip ends of the engagement teeth.

In the above seatbelt retractor, even if the locking means stops the take-up drum from rotating in the webbing-pull-out direction and the webbing applies the take-up drum a load working toward the pawl with respect to the axial direction, the projecting portion projecting from the engagement-side flange portion is positioned such that the axially outer surface thereof faces the engagement teeth for misalignment prevention. Thereby, the projecting portion can surely prevent significant misalignment of the pawl in axial direction from the engagement position of the pawl and the engagement teeth.

Further, the maximum outer peripheral dimension formed by the projecting portion and the engagement-side flange portion is set larger than inner peripheral diameter defined by tip ends of the engagement teeth. Therefore, even if the reactive force for locking the pawl and the engagement teeth causes the engagement-side flange portion to depart from the pawl and get contact with the engagement teeth, the projecting portion can stay at the position to face the engagement teeth. Thereby, the above configuration can surely prevent significant misalignment of the pawl in axial direction from the engagement position of the pawl and the engagement teeth.

Even if rigidity is sacrificed for weight reduction of the take-up drum and the housing, the projecting portion projecting from the engagement-side flange portion can easily be made high in projection height so as to surely prevent significant misalignment of the pawl in axial direction from the engagement position of the pawl and the engagement teeth. Even if, there is applied the take-up drum a load working toward the pawl with respect to axial direction, the projecting portion projecting from the engagement-side flange portion shoulders the load while abutting on the engagement teeth. Thus, degree of load the pawl has to shoulder can be reduced. Further, the number of pawls can be minimized to only one pawl at the engagement-side flange portion positioned so as to face the engagement teeth and the number of components thus can be reduced.

Further, in the above seatbelt retractor of the present invention, the projecting portion comprises one or two of stepped section(s) formed so as to swell up axially outward by height that is shorter than thickness of the pawl and positioned so as to project radially outward from at least one of both peripheral outer ends of the projecting portion each of which includes an area located radially outward over the inner peripheral diameter defined with tip ends of the engagement teeth in the state where the center axis of the through hole at the one-side wall portion and the rotation axis of the take-up drum align. Further, the pawl is configured to move toward the engagement position along a route secured at a peripherally inside with respect to the stepped section(s).

In the above seatbelt retractor, even if the webbing applies the take-up drum a load working toward the pawl with respect to axial direction so that the take-up drum consequently gets misaligned toward the pawl with respect to axial direction, the above configuration can get the stepped section(s) swelling up axially outward from the projecting portion to abut on the engagement teeth. Therefore, even if the take-up drum gets misaligned toward the pawl with respect to axial direction, a clearance for allowing the pawl to move is secured between the engagement teeth and the projecting portion at the peripherally inside with respect to the stepped section(s) swelling up from the projecting portion. Thereby, the stepped portion(s) can help stay the pawl closer to the projecting portion than the engagement teeth with respect to axial direction and the engagement of the pawl and the engagement teeth can be secured.

Further, in the above seatbelt retractor of the present invention, the engagement-side flange portion comprises a brim part which extends radially outward from a peripheral edge located at an axially outer side of the projecting portion. Further, in the state where the center axis of the through hole at the one-side wall portion and the rotation axis of the take-up drum align, the brim part is located at an axially outer side of the engagement teeth and formed so as to project radially outward over the inner peripheral diameter defined with tip ends of the engagement teeth.

In the above seatbelt retractor, even if the locking means stops the take-up drum from rotating in the webbing-pull-out direction and the webbing applies the take-up drum a load working in direction departing from the pawl with respect to axial direction, the brim part formed on the engagement-side flange portion is positioned such that the axially inner surface thereof faces the engagement teeth for misalignment prevention of the engagement-side flange portion. Thereby, the brim part can surely prevent significant misalignment of the pawl in axial direction from the engagement position of the pawl and the engagement teeth.

Further, in the above seatbelt retractor of the present invention, the brim part comprises one or two of outer stepped section(s) formed so as to swell up axially inward from an axially inner surface of the brim part by height that is shorter than thickness of the pawl and positioned at one or two positions each facing one of the both peripheral outer ends of the engagement position of the pawl and the engagement teeth. Further, the pawl is configured to move toward the engagement position along a route secured at a peripherally inside with respect to the outer stepped section(s).

In the above seatbelt retractor, even if the webbing applies the take-up drum a load working in direction departing from the pawl with respect to axial direction so that the take-up drum consequently gets misaligned in direction departing from the pawl with respect to axial direction, the above configuration can make the outer stepped section(s) swelling up axially inward from the brim section abut on the engagement teeth. Therefore, even if the take-up drum gets misaligned so as to depart from the pawl with respect to axial direction, a clearance for allowing the pawl to move is secured between the engagement teeth and the brim part at the peripherally inside with respect to the outer stepped portion(s) swelling up from the brim part. Thereby, the outer stepped section(s) can help stay the pawl closer to the brim part than the engagement teeth with respect to axial direction and the engagement of the pawl and the engagement teeth can be secured.

Further, in the above seatbelt retractor of the present invention, a through hole formed at the other-side wall portion opposing to the one-side wall portion comprises: a semicircular opening portion formed in a semicircular shape at a side of the webbing-pull-out direction; and an enlarged opening portion formed in a substantially U-shape so as to communicate with the semicircular opening portion and extend toward a lower peripheral edge of the other-side wall portion. Further, the enlarged opening portion is shaped suitable to prevent an other-side flange portion which is other one of the pair of flange portions from getting stuck with the through hole at the other-side wall portion when the projecting portion is made to go through the through hole at the one-side wall portion by inclining the take-up drum.

In the above seatbelt retractor, when the projecting portion is made to go through the through hole at the one-side wall portion by inclining the take-up drum, the other-side flange portion can be loosely inserted into the enlarged opening portion of the through hole at the other-side wall portion. Thereby, the take-up drum can easily be settled between the pair of side wall portions and efficiency in assembly work can be improved.

Further, in the above seatbelt retractor of the present invention, in the state where the center axis of the through hole at the one-side wall portion and the rotation axis of the take-up drum align, the other-side flange portion is located at an axially inner side of the semicircular opening portion and formed so as to project radially outward over an inner peripheral surface of the semicircular opening portion.

In the above seatbelt retractor, even if the locking means stops the take-up drum from rotating in the webbing-pull-out direction and the webbing applies the take-up drum a load working in direction departing from the pawl with respect to axial direction, the other-side flange portion is positioned such that the axially outer surface thereof faces the inner side surface of the semicircular opening portion. Thereby, the other-side flange portion can help prevent significant misalignment of the pawl in axial direction from the engagement position of the pawl and the engagement teeth.

Further, in the above seatbelt retractor of the present invention, the other-side flange portion comprises an other-side brim part which is configured to oppose to the other-side flange portion over the semicircular opening portion in the state where the center axis of the through hole at the one-side wall portion and the rotation axis of the take-up drum align. Further, the other-side brim part is formed so as to project radially outward over the inner peripheral face of the semicircular opening portion in the state where the center axis of the through hole at the one side wall portion and the rotation axis of the take-up drum align.

In the above seatbelt retractor, even if the locking means stops the take-up drum from rotating in the webbing-pull-out direction and the webbing applies the take-up drum a load working in direction toward the pawl with respect to axial direction, the other-side brim part formed on the other-side flange portion is positioned such that the axially inner surface thereof faces an outer side surface of the semicircular opening portion. Thereby, the other-side brim part can help prevent significant misalignment of the pawl in axial direction from the engagement position of the pawl and the engagement teeth.

DETAILED DESCRIPTION OF THE PREFERRED EMBODIMENTS

Hereinafter, an embodiment of the seatbelt retractor according to the present invention will be described in detail while referring to the accompanying drawings.

[Schematic Configuration]

First, a schematic configuration of a seatbelt retractor 1 according to the present embodiment will be described based on FIG. 1 through FIG. 3.

Figure 1:
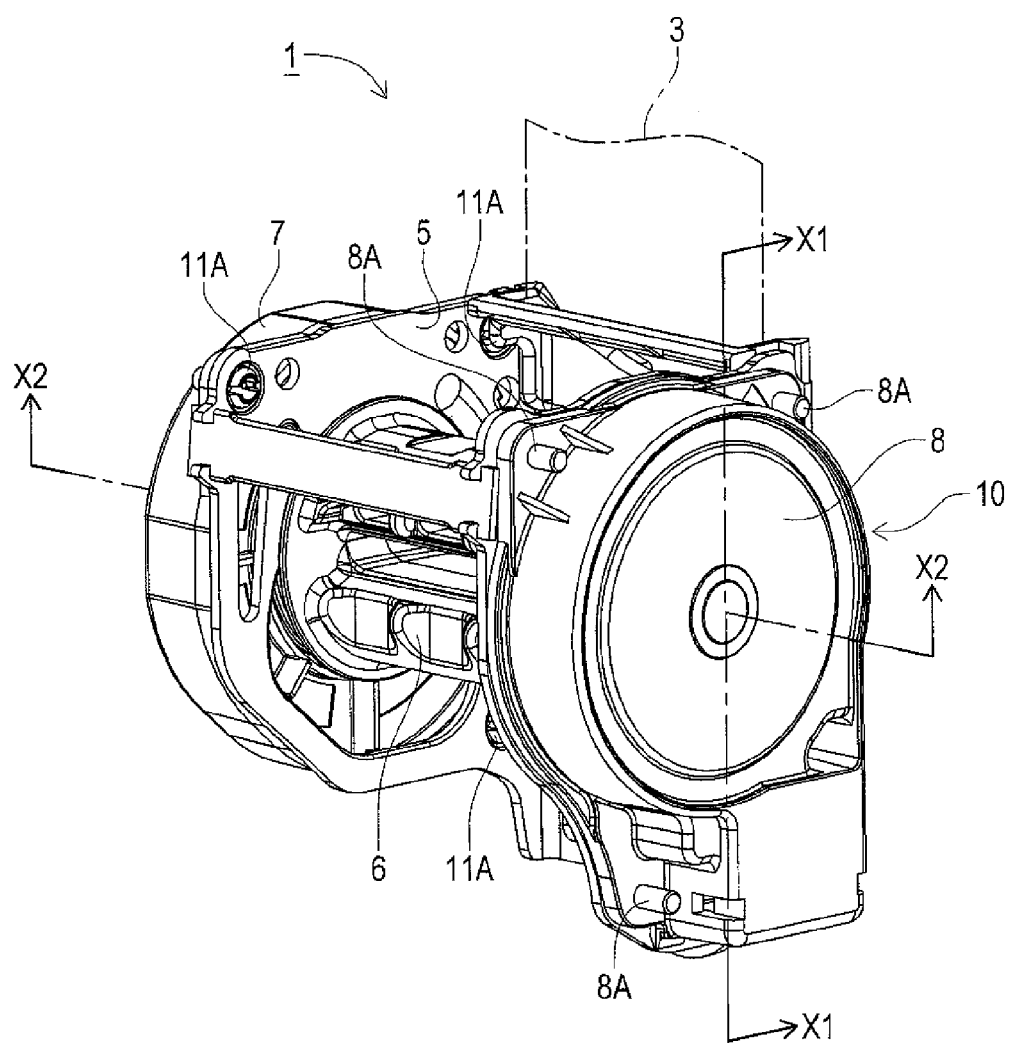
FIG. 1 is a perspective view showing an outer appearance of a seatbelt retractor according to a present embodiment.

FIG. 1 is a perspective view showing an external appearance of a seatbelt retractor 1 according to the first embodiment. FIG. 2 is an exploded perspective view of the seatbelt retractor 1. FIG. 3 is an overall cross sectional view taken along arrow X1-X1 in FIG. 1.

Figure 2:
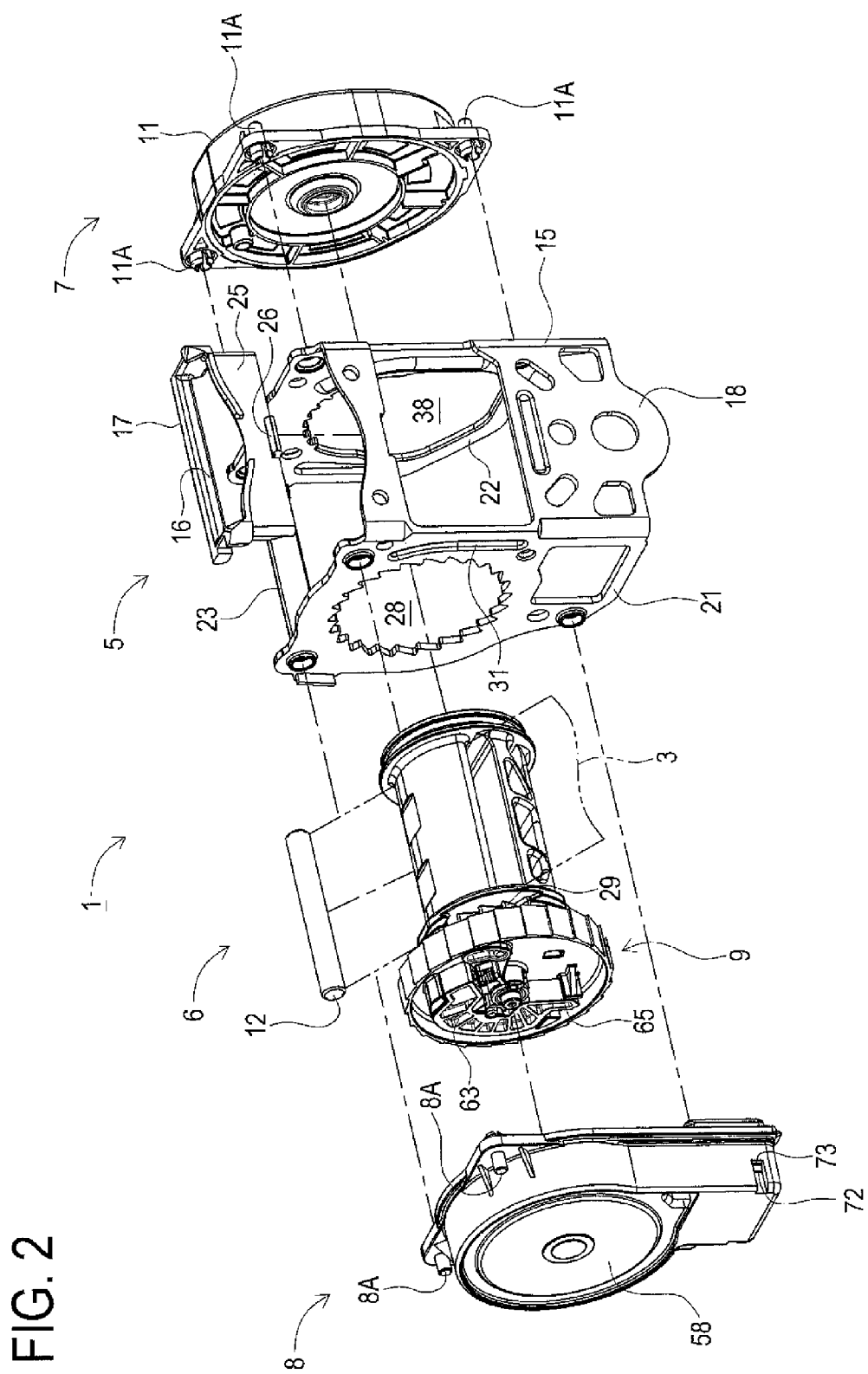
FIG. 2 is an exploded perspective view of the seatbelt retractor.
Figure 3:
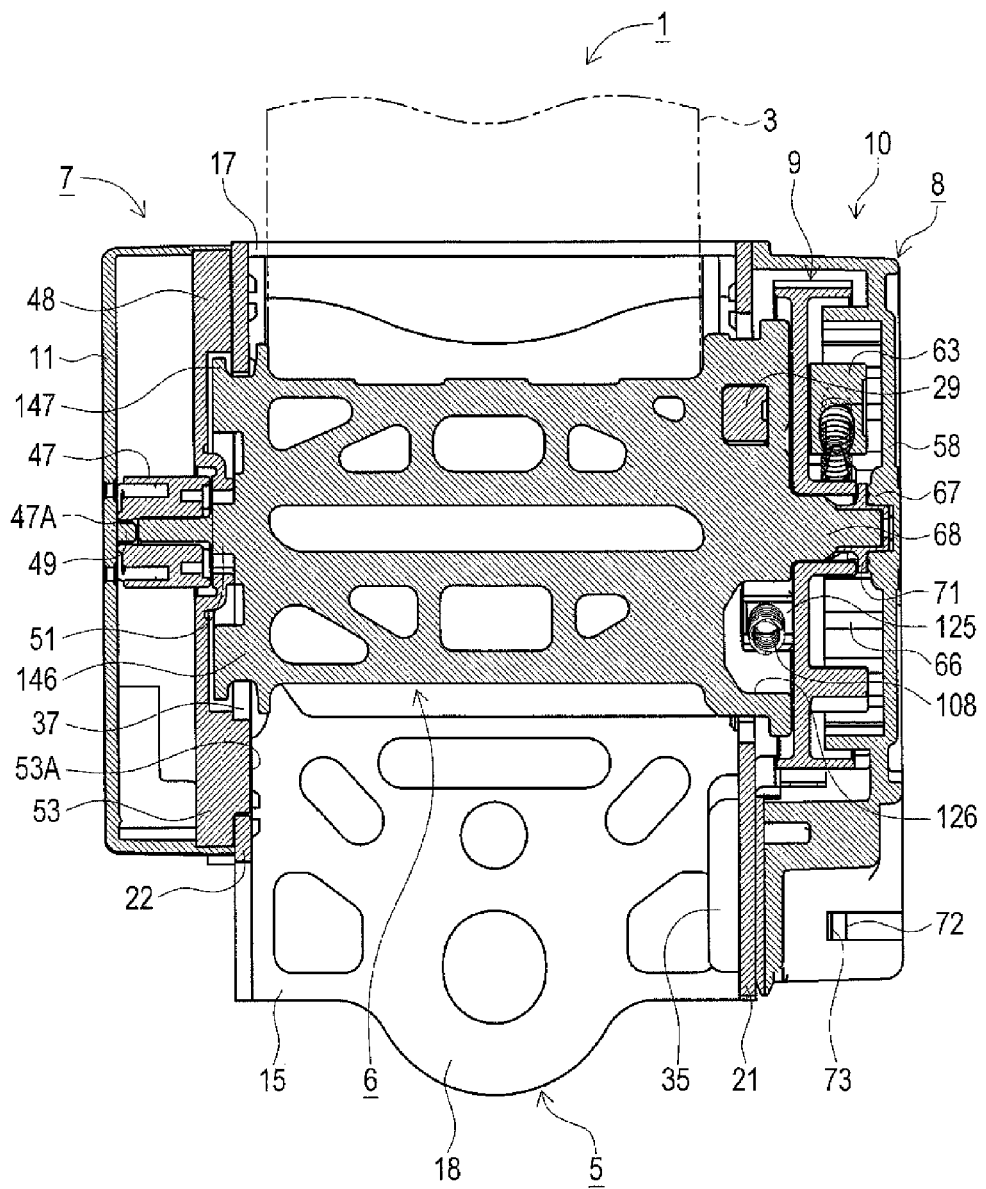
FIG. 3 is an overall cross sectional view taken along arrow X1-X1 in FIG. 1.

As shown in FIG. 1 through FIG. 3, the seatbelt retractor 1 is a device for retracting vehicle webbing 3. The seatbelt retractor 1 has a housing unit 5, a take-up drum unit 6, a take-up spring unit 7 and a mechanism cover unit 8. The take-up drum unit 6 includes a clutch unit 9. The mechanism cover unit 8 has nylon latches 8A integrally formed thereat. The mechanism cover unit 8 is fixed outside the housing unit 5 by the nylon latches 8A, in a manner covering the clutch unit 9. The mechanism cover unit 8 constitutes a lock mechanism 10 (refer to FIG. 31) that operates in cooperation with the clutch unit 9 and stops pull-out of the webbing 3 in response to abrupt pull-out of the webbing 3 or abrupt acceleration of a vehicle speed.

The take-up spring unit 7 has a spring case 11 (refer to FIG. 7) with nylon latches 11A integrally formed thereat. The take-up spring unit 7 is fixed outside the housing unit 5 by the nylon latches 11A. A slip-off prevention pin 12 is provided at an end portion of the webbing 3. The webbing 3 is inserted in and wound around the take-up drum unit 6. The take-up drum unit 6 is rotatably supported between the take-up spring unit 7 fixed to the housing unit 5 and the mechanism cover unit 8 fixed to the housing unit 5.

[Schematic Configuration of Housing Unit]

A schematic configuration of the housing unit 5 will next be described referring to FIG. 2 through FIG. 6.

Figure 4:
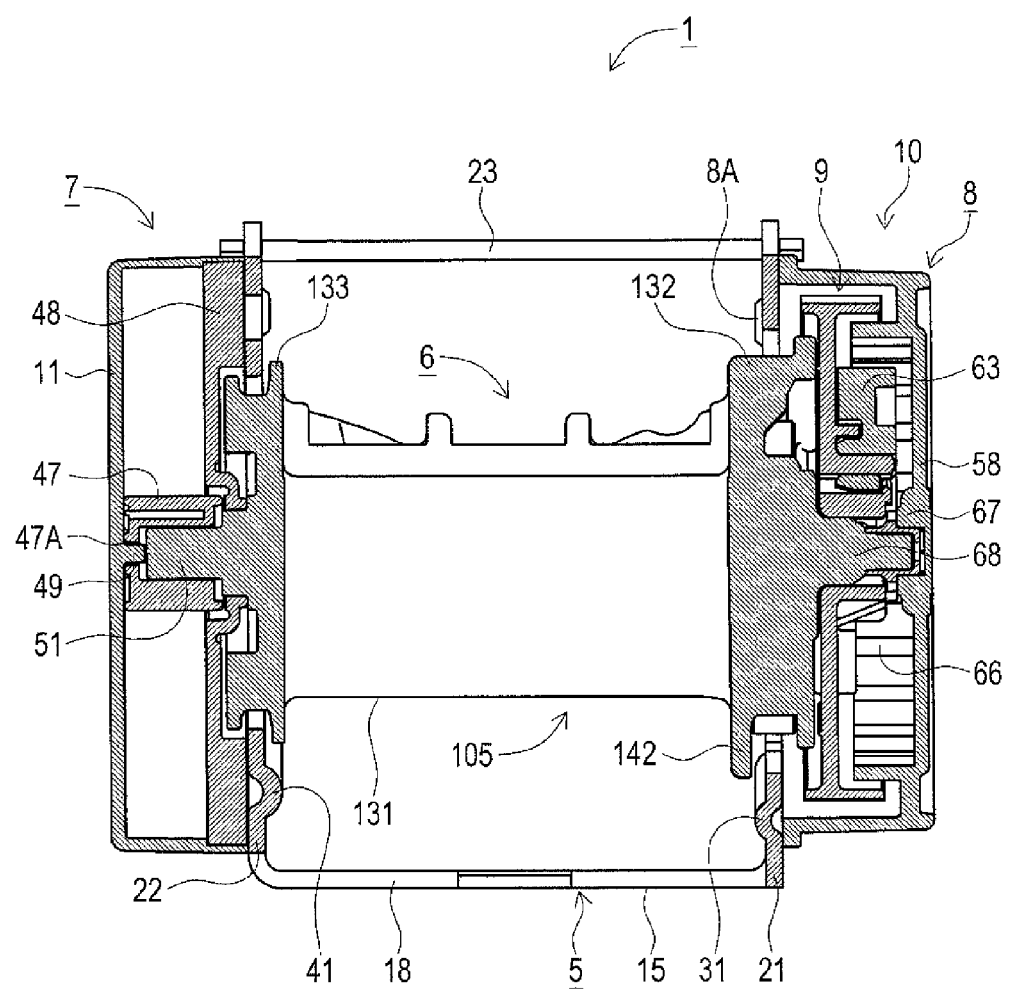
FIG. 4 is an overall cross sectional view taken along arrow X2-X2 in FIG. 1.
Figure 5:
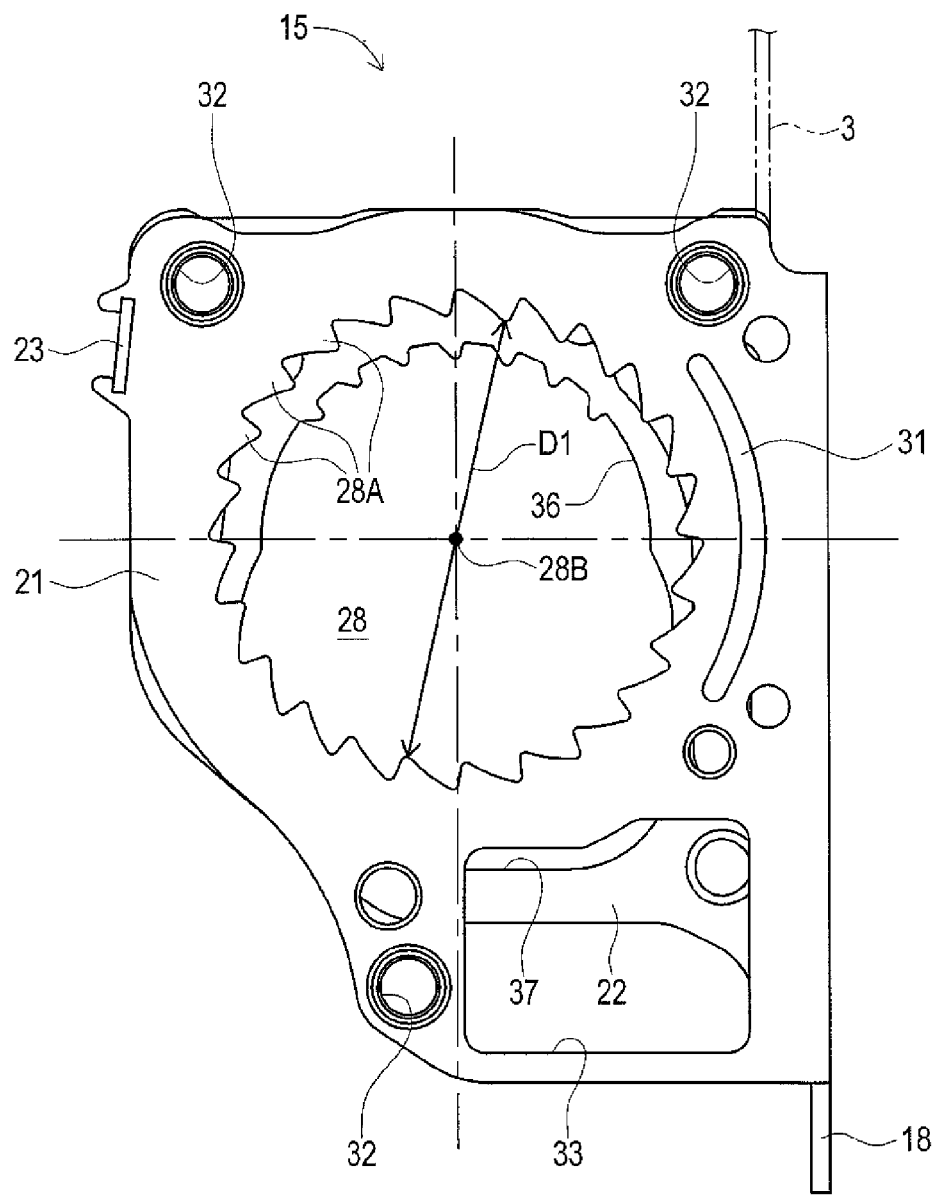
FIG. 5 is a side view of a housing seen at a side of a mechanism cover unit.
Figure 6:
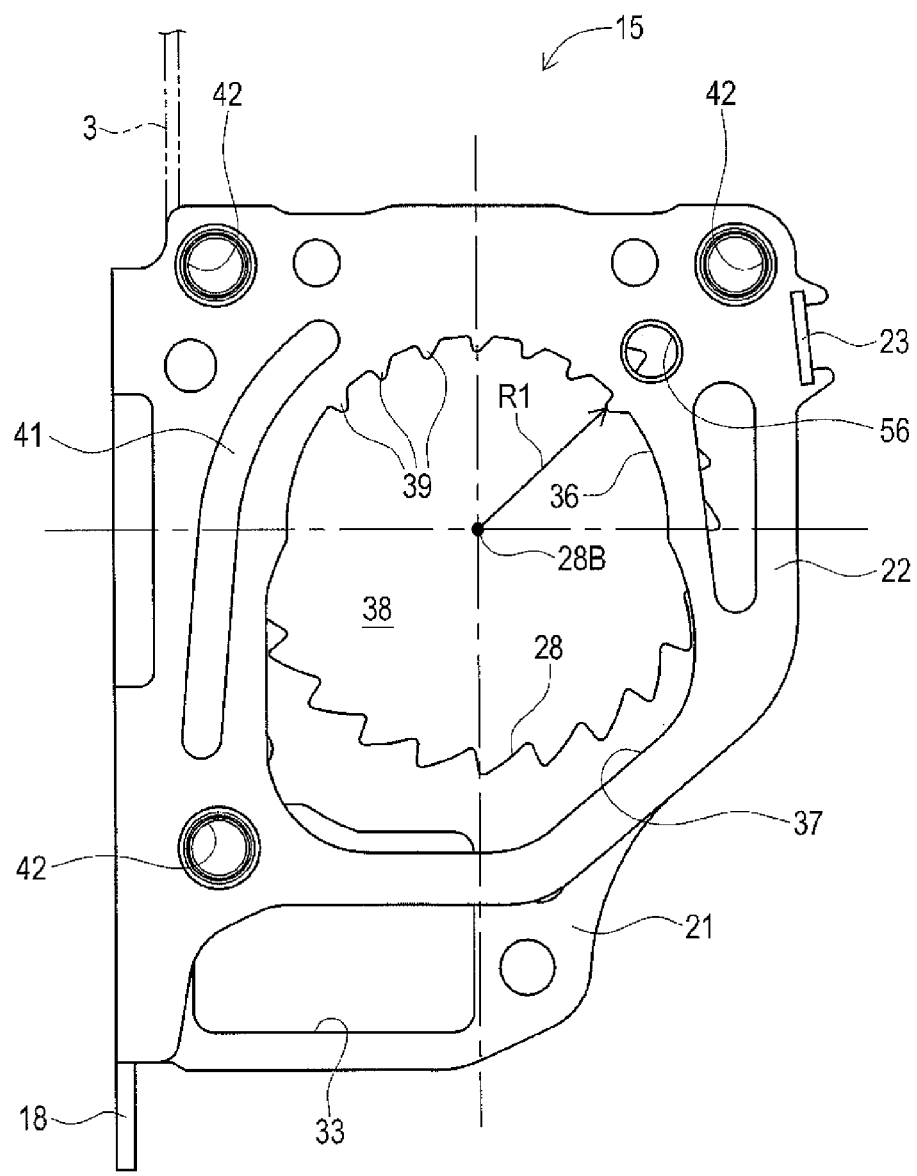
FIG. 6 is a side view of the housing seen at a side of a take-up spring unit.

FIG. 4 is an overall cross sectional view taken along arrow X2-X2 in FIG. 1. FIG. 5 is a side view of a housing seen at a side of the mechanism cover unit 8. FIG. 6 is a side view of the housing seen at a side of the take-up spring unit 7.

As shown in FIG. 2 and FIG. 3, the housing unit 5 includes a housing 15 and a protector 17. The housing 15 has a substantially U-shape in planer view. The horizontally long frame-like protector 17 is made of synthetic resin such as nylon. The protector 17 has a through hole 16 in a horizontally long square shape in planar view, from which the webbing 3 is drawn out.

The housing 15 has a back plate portion 18 to be fixed at a vehicle body and side wall portions 21, 22 opposed to each other and extending from both side edge portions of the back plate portion 18. The housing 15 is formed to have a substantially U-shape in planer view. The side wall portions 21, 22 are connected to each other by a connecting member 23. An opening portion is formed in the center of the back plate portion 18, and helps reduce weight and improves the efficiency in mounting operation of the webbing 3.

Further, the protector 17 has a wall portion 25 extended downward from a side edge portion of a back plate portion 18 side, and an engagement projection 26 in the center of a lower edge of the wall portion 25. The engagement projection 26 projects outward. The protector 17 is inserted into the housing 15 while abutting on the back plate portion 18 at the wall portion 25 thereof so as to be positioned between the side wall portions 21, 22 opposite to each other, so that the engagement projection 26 of the protector 17 is elastically locked and fixed at the upper end portion of the opening portion formed at the back plate portion 18.

The long side of through hole 16 of the protector 17 is formed to have approximately the same length as the width dimension of the webbing 3. Further, the short side of the through hole 16 is formed so as to face almost any possible dimensional outer peripheral surface of wound-up-state webbing 3, namely, from the minimum wound-up diameter to the maximum wound-up diameter. Thereby, the webbing 3 can be drawn out or taken up smoothly.

As shown in FIGS. 2, 4 and 5, a circular through hole 28 is formed in an approximate center of the side wall portion 21 on which the mechanism cover unit 8 is attachable. Further, V-shaped engagement teeth 28A are formed on an entire inner peripheral surface of the through hole 28. The engagement teeth 28A are configured, as later described, to engage with a pawl 29 arranged in a manner retractable from the outer peripheral surface of the take-up drum unit 6 to stop the rotation of the take-up drum unit 6 in webbing pull out direction (See FIG. 32).

The side wall portion 21 includes a reinforcement groove 31 in a peripheral portion at the back plate portion 18 side of the through hole 28. The reinforcement groove 31 is recessed inward (leftward in FIG. 4) substantially in a semi-circular shape in cross section, and formed arc-like to be concentric with respect to the through hole 28. The side wall portion 21 further includes mounting holes 32 each having an edge formed by burring so as to project outward (leftward in FIG. 2) in a predetermined height (for instance, approximately 1.5 mm high). The mounting holes 32 are formed penetrating at three locations including both upper edge corner portions, and a lower edge portion immediately below an axial center 28B of the through hole 28.

The nylon latches 8A of the mechanism cover unit 8 are fitted inside the mounting holes 32 and attached thereon, respectively. The peripheries of base end portions of the nylon latches 8A make contact with the edge portions of the mounting holes 32 projecting outward at a predetermined height by burring, so that the height of the top of each nylon latch 8A projecting from the inner surface of the side wall portion 21 when mounted in a mounting hole 32 can be lowered (for instance, the projecting height can be lowered from approx. 2 mm to approx. 0.5 mm).

Beneath the through hole 28 of the side wall portion 21, a substantially rectangular opening portion 33 is formed at a portion from immediately below the center axis 28B of the through hole 28 to the back plate portion 18 side. In the opening portion 33, a sensor cover 35 (See FIG. 8) of a mechanism cover unit 8 is inserted in a closed-up state.

As shown in FIGS. 2, 4 and 6, a through hole 38 is formed at the center of the side wall portion 22 where the take-up spring unit 7 is mountable. The through hole 38 consists of a semicircular opening portion 36 and an enlarged portion 37. The semicircular opening portion 36 is formed as an opening substantially semicircular at a webbing pull-out side, around the center axis 28B of the through hole 28. The enlarged opening portion 37 is formed as a substantially U-shaped opening, communicating with the semicircular opening portion 36 and extending toward a lower peripheral edge portion of the side wall portion 22.

As shown in FIGS. 5 and 6, the inner peripheral diameter of the semicircular opening portion 36 formed in the side wall portion 22 is set smaller than the inner peripheral diameter D1 defined by tip ends of the engagement teeth 28A of the through hole 28 formed in the side wall portion 21. A plurality of (seven in FIG. 6) small V-shaped projections 39 are formed on the inner periphery of the upper edge portion of the semicircular opening portion 36. The inner periphery diameter defined by the plurality of V-shaped projections 39 is formed with a radius R1. The substantially U-shaped enlarged opening portion 37 formed in the side wall portion 22 is extended downward while slightly widening outward from both lower end portions of the semicircular opening portion 36, such that the lower edge portion of the enlarged opening portion 37 is located at a position corresponding to the opening portion 33 formed below the through hole 28 of the side wall portion 21.

As shown in FIGS. 4 and 6, the side wall portion 22 includes a reinforcement groove 41 in a peripheral portion at the back plate portion 18 side of the enlarged opening portion 37 and the semicircular opening portion 36. The reinforcement groove 41 is recessed inward (rightward in FIG. 4) substantially in a semi-circular shape in cross section. The reinforcement groove 41 is formed arc-like to be concentric with respect to the semicircular opening portion 36, along the peripheral portion of the semicircular opening portion 36, and then extended downward while slightly slanted toward the back plate portion 18 side along the peripheral portion of the enlarged opening portion 37, such that the lower edge portion is located approximately at a position corresponding to the lower edge of the through hole 28.

The side wall portion 22 further includes mounting holes 42 each having an edge formed by burring so as to project outward (rightward in FIG. 2) in a predetermined height (for instance, approximately 1.5 mm high). The mounting holes 42 are formed penetrating at three locations including both upper edge corner portions, and a lower edge portion below the reinforcement groove 41. The nylon latches 11A formed on the cover case 11 of the take-up spring unit 7 are fitted inside the mounting holes 42 and attached thereon, respectively.

The peripheries of base end portions of the nylon latches 11A make contact with the edge portions of the mounting holes 42 projecting outward at a predetermined height by burring, so that the height of the top of each nylon latch 11A projecting from the inner surface of the side wall portion 22 when mounted in a mounting hole 42 can be lowered (for instance, the projecting height can be lowered from approx. 2 mm to approx. 0.5 mm).

[Schematic Configuration of Take-up Spring Unit]

Figure 7:
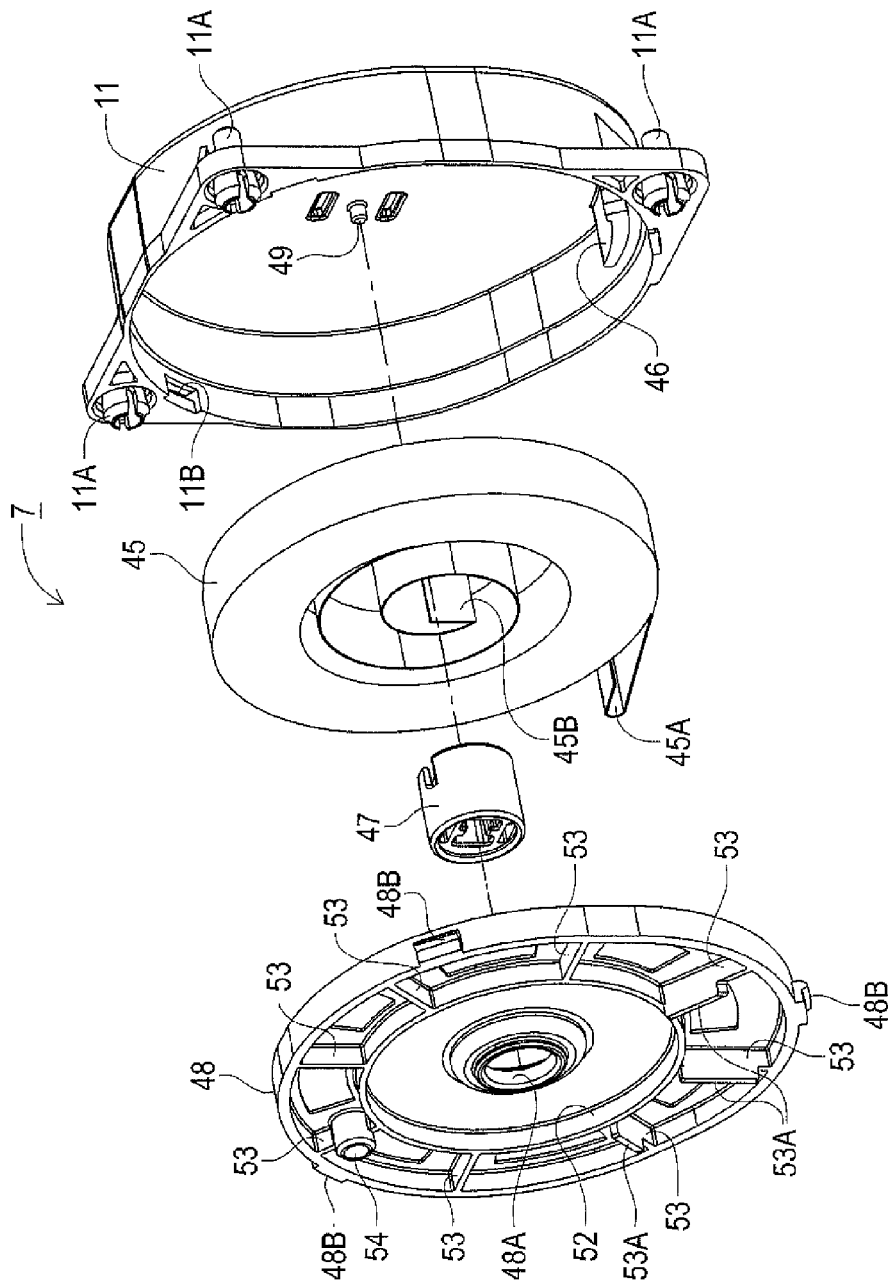
FIG. 7 is an exploded perspective view of the take-up spring unit.

Next, a schematic configuration of the take-up spring unit 7 will be described based on FIGS. 2 through 4 and 7. FIG. 7 is an exploded perspective view of the take-up spring unit 7.

As shown in FIGS. 2 through 4 and 7, the take-up spring unit 7 has a spiral spring 45, the spring case 11, a spring shaft 47 and a spring seat 48. The spring case 11 fixes an outer end 45A of the spiral spring 45 at a rib 46 projected from the bottom face of the inner peripheral portion thereof, and accommodates this spiral spring 45. An inner end 45B of the spiral spring 45 is fitted in the spring shaft 47 so that the spring shaft 47 is urged by the spring force. The spring seat 48 is attached to the spring case 11 to cover the spiral spring 45.

A pin 49 is erected approximately at the center position of a bottom face portion of the spring case 11. The pin 49 is inserted into a through hole 47A in the bottom face portion of the spring shaft 47, to rotatably support the spring shaft 47 at the bottom face portion side. Further, the spring seat 48 has an approximately cylindrical boss portion 48A at the center portion thereof. At the peripheral portion on the base end side of the cylindrical boss portion 48A, a stepped portion having a circular shape in cross section is formed, to rotatably support the end portion of the spring shaft 47 of the spring seat 48 side. Further, the spring seat 48 has fixing projections 48B at three locations on the outer peripheral portion thereof. The fixing projections 48B are elastically locked with fixing holes 11B provided at the opening side circumferential portion of the spring case 11, respectively, so that the spring seat 48 is fixed.

The base end portion of a spring-side shaft 51 of the take-up drum unit 6 is fitted at the approximately cylindrical boss portion 48A provided at the center portion of the spring seat 48 and rotatably supported. At the same time, the tip portion of the shaft 51 of the take-up drum unit 6 is formed in an H-shape in cross section, and is inserted into a cylindrical hole formed in an H-shape in cross section at the spring shaft 47, and coupled to the spring shaft 47 in a relatively non-rotatable manner. Accordingly, the urging force of the spiral spring 45 constantly urges the take-up drum unit 6 to rotate in the take-up direction of the webbing 3 through the spring shaft 47.

Further, a rib 52 is erected on a surface of the spring seat 48 at the side wall portion 22 side. The rib 52 is formed in a ring-like shape to cover the outer peripheral portion of the edge portion of the take-up drum unit 6. A plurality of reinforcement ribs 53 are radially formed from the outer periphery of the rib 52, extending radially outward to the outer peripheral portion. From among the plurality of reinforcement ribs 53, reinforcement ribs 53 located in a position to face the enlarged opening portion 37 formed in the side wall portion 22 of the housing 15 are each provided with a positioning portion 53A on the upper end portion thereof. The positioning portion 53A is formed so as to project from the outer periphery of the rib 52 to a position to face the inner periphery of the enlarged opening portion 37 at a height dimension substantially equal to the thickness of the side wall portion 22.

A cylindrical positioning boss 54 is formed on the outside of the rib 52 of the spring seat 48. The positioning boss 54 is configured to be inserted into a positioning hole 56 (See FIG. 6) formed at the peripheral portion on the connecting member 23 side of the semicircular opening portion 36 of the side wall portion 22. Accordingly, if the positioning boss 54 is fitted into the positioning hole 56 and the take-up spring unit 7 is fixed through the nylon latches 11A at the mounting holes 42 of the side wall portion 22, the positioning portions 53A of the reinforcement ribs 53 are inserted inside the enlarged opening portion 37 to be substantially level with the inner surface of the side wall portion 22, as shown in FIG. 3.

[Schematic Configuration of Mechanism Cover Unit]

Figure 8:
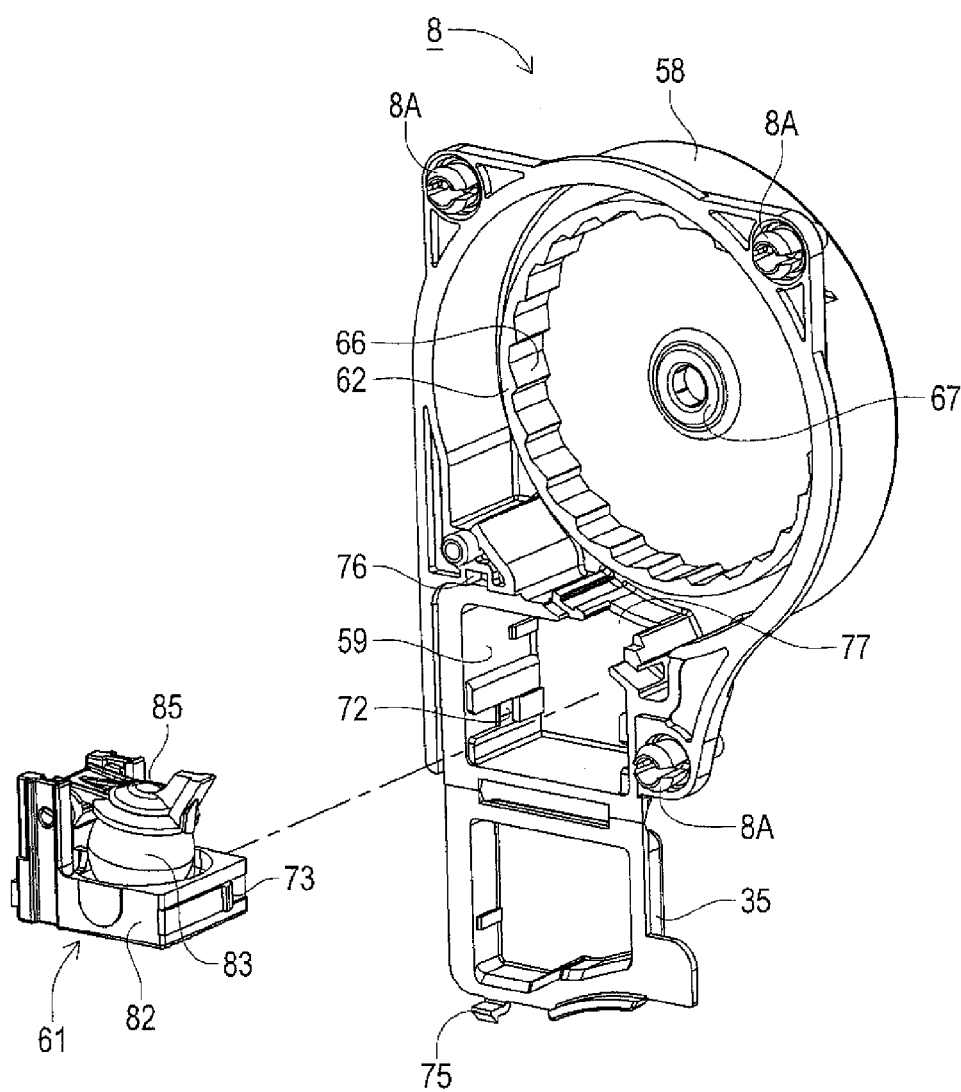
FIG. 8 is an exploded perspective view of the mechanism cover unit.

A schematic configuration of the mechanism cover unit 8 will be described referring to FIGS. 2 through 4, and 8. FIG. 8 is an exploded perspective view of the mechanism cover unit 8.

As illustrated in FIGS. 2 through 4, and 8, the mechanism cover unit 8 is made up of a mechanism cover 58 and an acceleration sensor 61. The mechanism cover 58 is mounted by the nylon latches 8A outside the side wall portion 21 of the housing unit 15, so as to cover the clutch unit 9. The acceleration sensor 61 operates as an emergency lock starting system housed inside a sensor housing portion 59 of the mechanism cover 58.

The mechanism cover 58 has an annular rib portion 62 formed on the inner surface facing the clutch unit 9, coaxially with regard to the axial center 28B of the through hole 28 in the side wall portion 21. On the inner periphery of the rib portion 62, there is formed a locking gear 66 that engages with the engagement claw 65 of a locking arm 63, to be later described (See FIG. 31). The locking gear 66 is designed to engage with the engagement claw 65 of the locking arm 63 only when the clutch unit 9 rotates in the webbing pull-out direction, to be later described (See FIG. 31).

Further, a substantially cylindrical supporting boss 67 is formed in the center portion of the annular rib portion 62. The tip portion of a mechanism-side shaft 68 of the take-up drum unit 6 is fitted into the supporting boss 67 with a bearing cap 71 therebetween and pivotally supported in a sliding and rotatable manner.

Further, the sensor housing portion 59 is formed substantially into a cross-sectionally rectangular concave shape, and provided with a pair of fixing holes 72 formed at the depth side of both side wall portions.

A pair of fixing claws 73 provided at both sides of the acceleration sensor 61 is fitted into the fixing holes 72 and is fixed thereat, and then a fixing claw 75 of the sensor cover 35 is fitted into a fixing hole 76 provided at the upper end portion of the sensor housing portion 59 and is fixed thereat, so that the mechanism cover unit 8 is configured. An opening portion 77 is formed below the annular rib portion 62 to communicate with the sensor housing portion 59.

[Schematic Configuration of Acceleration Sensor]

Hereinafter, the schematic configuration of the acceleration sensor 61 will be described referring to FIGS. 8 through 17.

Figure 9:
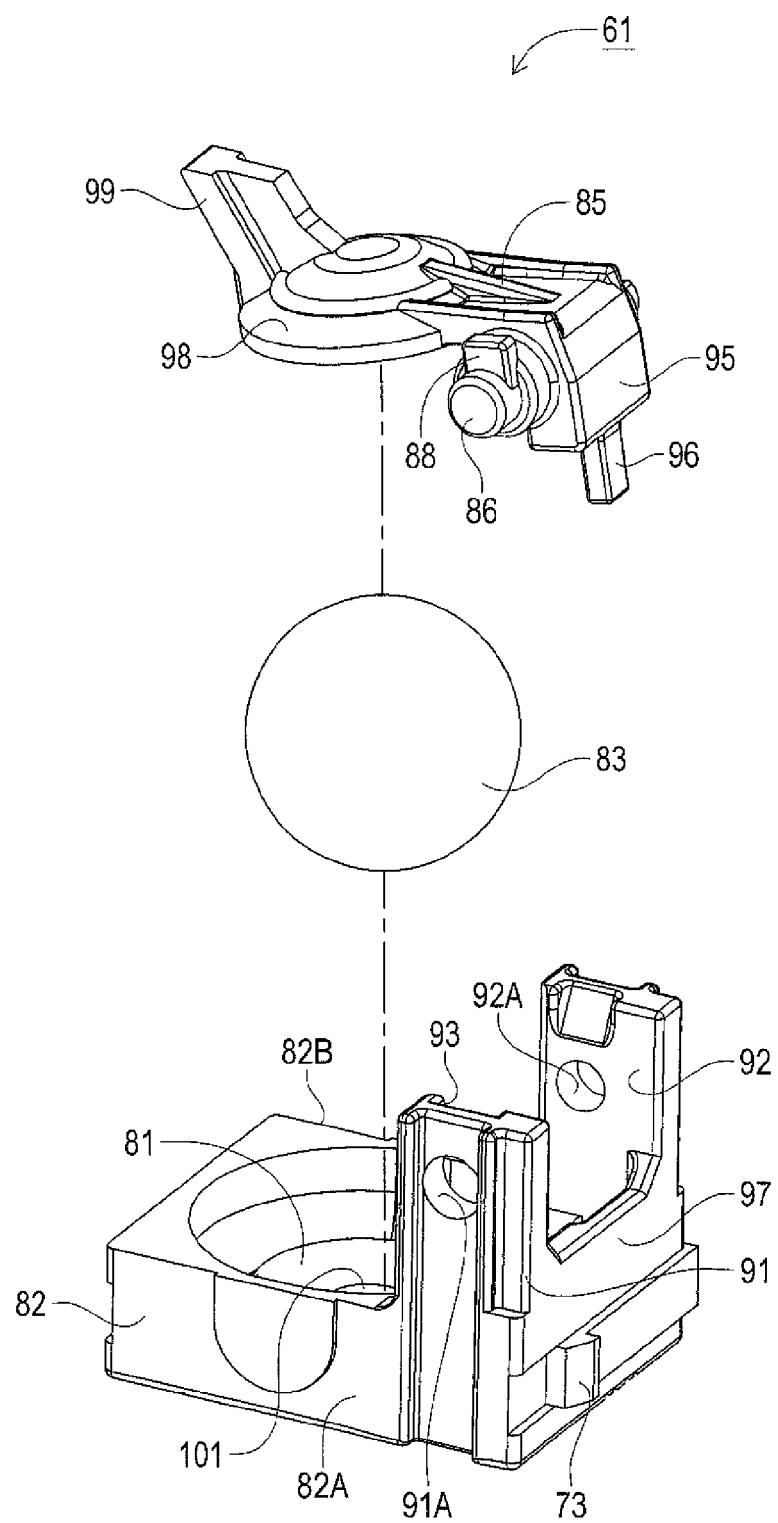
FIG. 9 is an exploded perspective view of an acceleration sensor.
Figure 10:
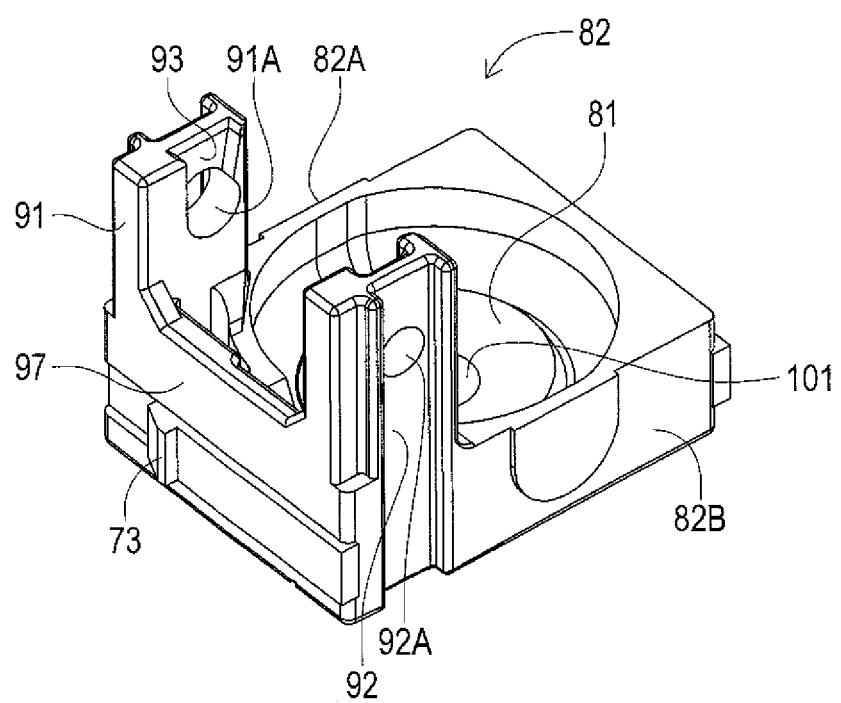
FIG. 10 is a perspective view of a sensor holder.
Figure 11:
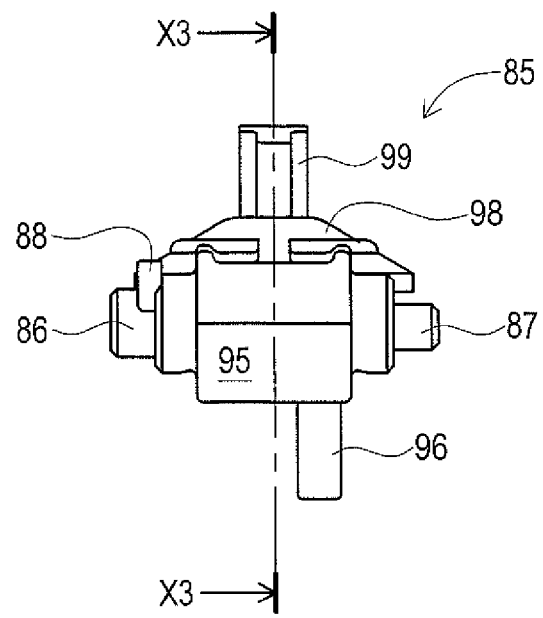
FIG. 11 is a front view of a sensor lever seen at a side of a shaft portion thereof.
Figure 12:
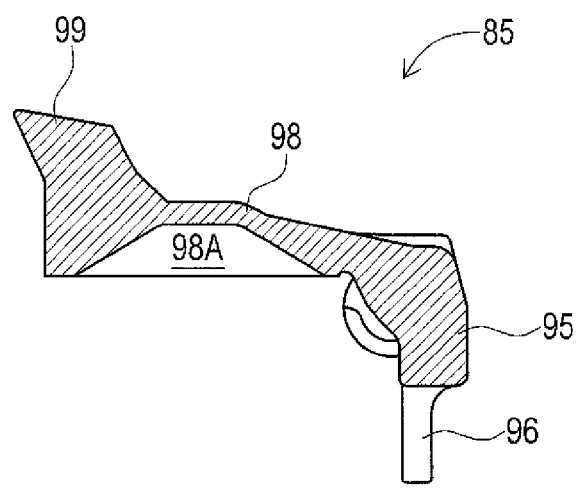
FIG. 12 is a cross sectional view taken along arrow X3-X3 in FIG. 11.

FIG. 9 is an exploded perspective view of the acceleration sensor 61. FIG. 10 is a perspective view of a sensor holder 82 of FIG. 9 seen from the depth side thereof. FIG. 11 is a front view of a sensor lever 85 seen at a side to be mounted on the sensor holder 82. FIG. 12 is a cross sectional view taken along arrow X3-X3 in FIG. 11. FIGS. 13 through 17 are explanatory views illustrating operational states of the sensor lever 85 that vertically moves along the movement of an inertial mass 83.

As shown in FIGS. 8 and 9, the acceleration sensor 61 includes the sensor holder 82, the inertial mass 83 and the sensor lever 85. The sensor holder 82 is made of resin, formed in an approximately box shape with its upper side open and has a bowl-shaped mounting portion 81 on a bottom face. The inertial mass 83 is made of metal such as steel, formed into a spherical body and movably placed on the mounting portion 81. The sensor lever 85 is made of resin, placed on the upper side of the inertial mass 83. The sensor holder 82 swingably supports the sensor lever 85.

Further, as shown in FIGS. 8 through 12, in the sensor lever 85, shaft portions 86, 87 are configured to project outward on the same axis, from both side face portions of one end portion in longitudinal direction. When the acceleration sensor 61 is housed inside the sensor housing portion 59, the shaft portion 86 is positioned at the depth side of the sensor housing portion 59, and the shaft portion 87 is positioned closer to the sensor cover 35. The outer diameter of the shaft portion 86 is slightly larger than the shaft portion 87. A projecting portion 88 projects upward at the base end portion of the shaft portion 86. The projecting portion 88 is rectangular shaped and has predetermined axial thickness (for instance, approximately 0.7 mm to 1.0 mm thick) in direction and a width equal to the shaft width in front view.

Further, as shown in FIGS. 9 and 10, the sensor holder 82 has side wall portions 82A, 82B facing the shaft portions 86, 87, respectively. The side wall portions 82A, 82B are respectively provided with supporting wall portions 91, 92 projecting upward at one-end portions thereof. In the upper portions of the supporting wall portions 91, 92, supporting holes 91A, 92A are formed, in a manner penetrating in the thickness direction with an inner diameter substantially equal to the diameter of the shaft portions 86, 87, respectively.

Further, a cutout groove 93 is formed on the inner surface of the supporting wall portion 91. The cutout groove 93 is cut out from the center to the upper end of the supporting hole 91A, at a width substantially the same as the inner diameter of the supporting hole 91A and a depth substantially the same as the thickness of the projecting portion 88. The inner wall of the cutout groove 93 is formed slanting at a side closer to the mounting portion 81, obliquely outward (in upper right direction in FIG. 10) from the outer periphery of the supporting hole 91A to the upper end.

Through placing the inertial mass 83 on the mounting portion 81 of the sensor holder 82, and then fitting the shaft portions 86, 87 of the sensor lever 85 into the supporting holes 91A, 92A from above, the sensor lever 85 is held in a vertically rotatable manner. As later described, the projecting portion 88 formed at the base end portion of the shaft portion 86 is loosely fit inside the cutout groove 93 formed above the supporting hole 91A, so that the maximum upward rotation angle of the sensor lever 85 is regulated (See FIG. 17).

Further, as shown in FIGS. 9 through 13, the sensor lever 85 has an extending portion 95 extended downward from one longitudinal end portion, in entire width at a predetermined thickness (for instance, approximately 2 mm thick) with regard to width direction (horizontal direction in FIG. 11), to reach below the shaft portions 86, 87. The extending portion 95 has a contact lever 96 rectangular shaped in cross section at the lower edge portion thereof. The contact lever 96 is extended further downward from an inner corner at a side closer to the shaft portion 87, at approximately one-third of the width of the entire width of the extending portion 95 in rotational axis direction, at an approximately a half of the thickness of the extending portion 95. However, the contact lever 96 may be configured to extend downward from an inner corner at a side closer to the shaft portion 86 of the extending portion 95.

Figure 13:
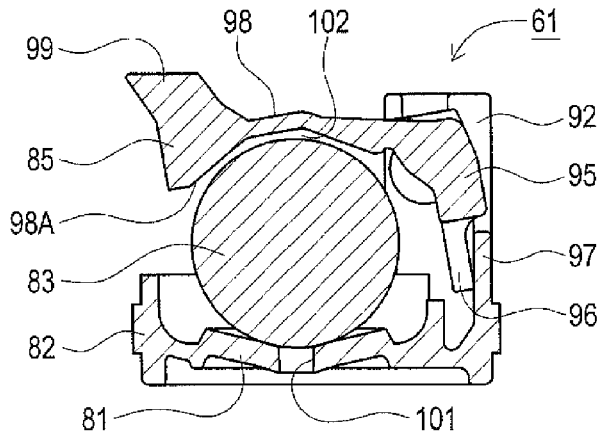
FIG. 13 is a central sectional view illustrating a state where an inertial mass stays motionless.

Further, the supporting wall portions 91, 92 of the sensor holder 82 have a regulating wall portion 97, on base end sides, between the outer side edge portions thereof with regard to the mounting portion 81 in width direction. The regulating wall portion 97 is extended further upward from the upper end of the side wall portion of the sensor holder 82. As shown in FIG. 13, the upper edge of the regulating wall portion 97 is positioned slightly below the lower edge portion of the extending portion 95 of the sensor lever 85 pivotally supported by the supporting wall portions 91, 92. The lower edge portion of the contact lever 96 makes contact with the inner surface of the regulating wall portion 97 so that the rotation range of the sensor lever 85 in lower direction is regulated. The extending portion 95 and the contact lever 96 operate as a contact portion.

Further, as shown in FIG. 9 through FIG. 13, the sensor lever 85 has a cover portion 98 that covers the upper side of the inertial mass 83. The cover portion 98 has a locking claw 99 projecting obliquely upward, at the upper side opposite to the extending portion 95. A predetermined clearance is formed between the inertial mass 83 mounted on the mounting portion 81 and the inner wall surface of the sensor holder 82, around the entire circumference thereof in the circumferential direction. The inertial mass 83 is configured to move on the mounting portion 81 in response to acceleration exceeding a predetermined value, and allowed to move within the range of the clearance.

Further, a lower surface side of the cover portion 98 has a contact portion 98A recessed in a bowl-like shape so as to correspond to the outer surface of the inertial mass 83. The inertial mass 83 moves on the mounting portion 81 to make contact with and push up the contact portion 98A recessed in the bowl-like shape on the lower surface side of the cover portion 98, so that the sensor lever 85 rotates upward. In the center of the mounting portion 81, a communicating hole 101 is formed, communicating to the lower surface.

Hereinafter, the vertical rotation range of the sensor lever 85 will be described referring to FIGS. 13 through 17.

Figure 16:
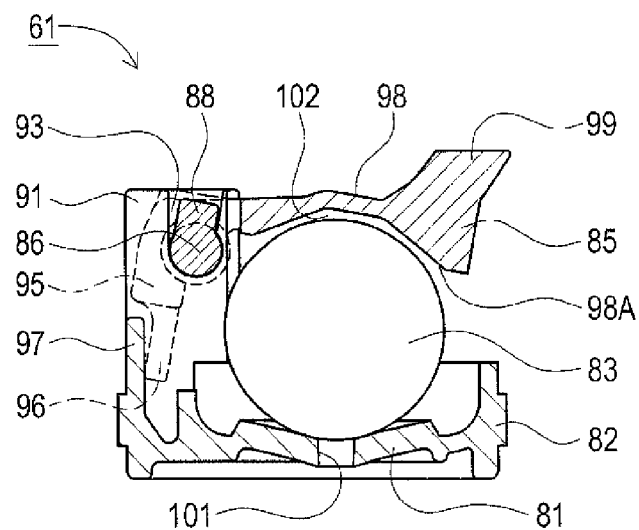
FIG. 16 is a cross sectional view illustrating a state of the shaft portion when the inertial mass stays motionless.

As shown in FIGS. 13 and 16, in a resting state where the inertial mass 83 rests on the bottom of the mounting portion 81, the sensor lever 85 is rotated downward by its own weight, and the lower edge portion of the contact lever 96 makes contact with the inner surface of the regulating wall portion 97 so that the rotation range in lower direction of the sensor lever 85 is regulated. Further, an internal clearance 102 of a predetermined width (for instance, the internal clearance of approximately 0.5 mm wide) is formed between the contact portion 98A recessed in the bowl-like shape on the lower surface of the cover portion 98 and the inertial mass 83.

Further, a narrow clearance is formed between the projecting portion 88 at the base end portion of the shaft portion 86 and the inner wall portion on a mounting portion 81 side of the cutout groove 93 on the supporting wall portion 91.

Accordingly, if the fluctuation of the acceleration of a vehicle is within a range of fluctuation in which the inertial mass 83 is out of contact with the contact portion 98A of the sensor lever 85, the contact portion 98A of the sensor lever 85 can be prevented from contacting the inertial mass 83 even if the sensor lever 85 vertically moves.

Figure 14:
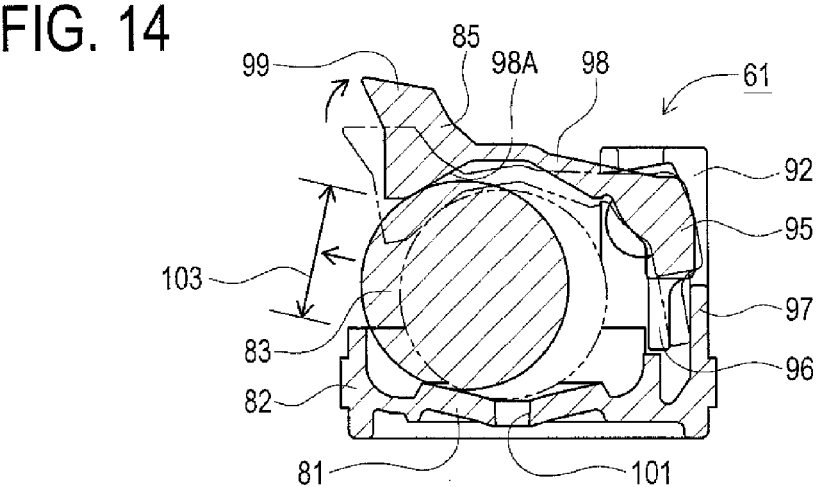
FIG. 14 is a central sectional view illustrating a state where the inertial mass moves to a front end of the sensor lever.
Figure 15:
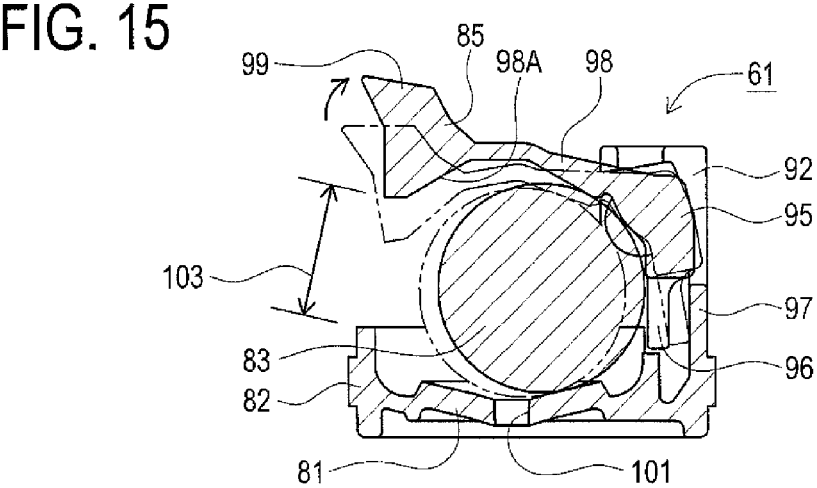
FIG. 15 is a central sectional view illustrating a state where the inertial mass moves to the shaft portion of the sensor lever.
Figure 17:
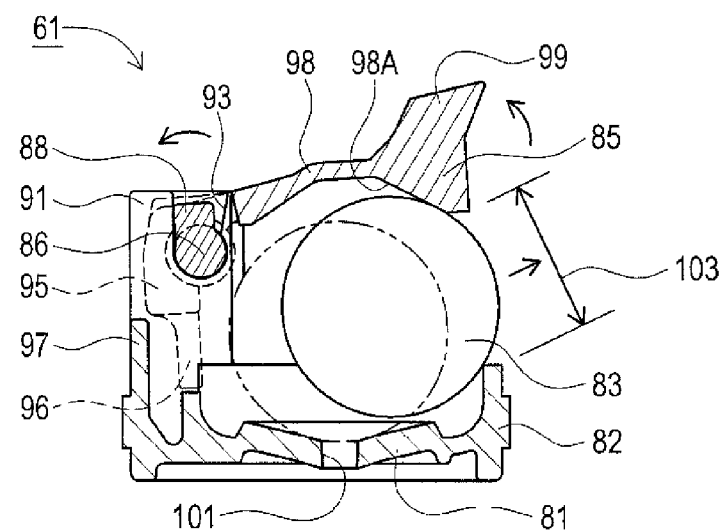
FIG. 17 is a cross sectional view illustrating a state of the shaft portion when the sensor lever is rotated to reach a maximum lift position.

Further, as shown in FIGS. 14, 15 and 17, in response to an acceleration of a vehicle exceeding a predetermined value (for instance, exceeding 0.4 G, regarding 1 G≈9.8 m/s$^2$), the inertial mass 83 moves on the mounting portion 81 to make contact with and push the contact portion 98A on the lower surface side of the cover portion 98. In this case, the upper limit of the rotation of the sensor lever 85 is a position where the locking claw 99 makes contact with a clutch gear 112 (see FIG. 31) of a locking clutch 106 included in the clutch unit 9. However, in a state the acceleration sensor 61 only is provided, the maximum rotated position of the sensor lever 85 in upward direction is set higher than the position where the locking claw 99 makes contact with the clutch gear 112.

Specifically, the projecting portion 88 at the base end portion of the shaft portion 86 makes contact with an inner wall surface of the cutout groove 93 of the supporting wall portion 91, the inner wall portion opposite to the mounting portion 81, and regulates the rotation range of the sensor lever 85 in upward direction, so that the maximum rotated position of the sensor lever 85 in upward direction can be set.

Further, an opening 103 between the sensor lever 85 and the peripheral wall portion of the sensor holder 82 is set to be smaller than the diameter of the inertial mass 83 when the sensor lever 85 reaches the maximum rotated position in upward direction. The lower end portion of the contact lever 96 of the sensor lever 85 is moved away from the inner surface of the regulating wall portion 97 and rotated toward the mounting portion 81. Incidentally, the lower edge portion of the contact lever 96 is configured not to make contact with the bottom face portion of the sensor holder 82. The sensor lever 85 is configured to smoothly rotate in vertical direction.

[Schematic Configuration of Take-up Drum Unit]

Figure 18:
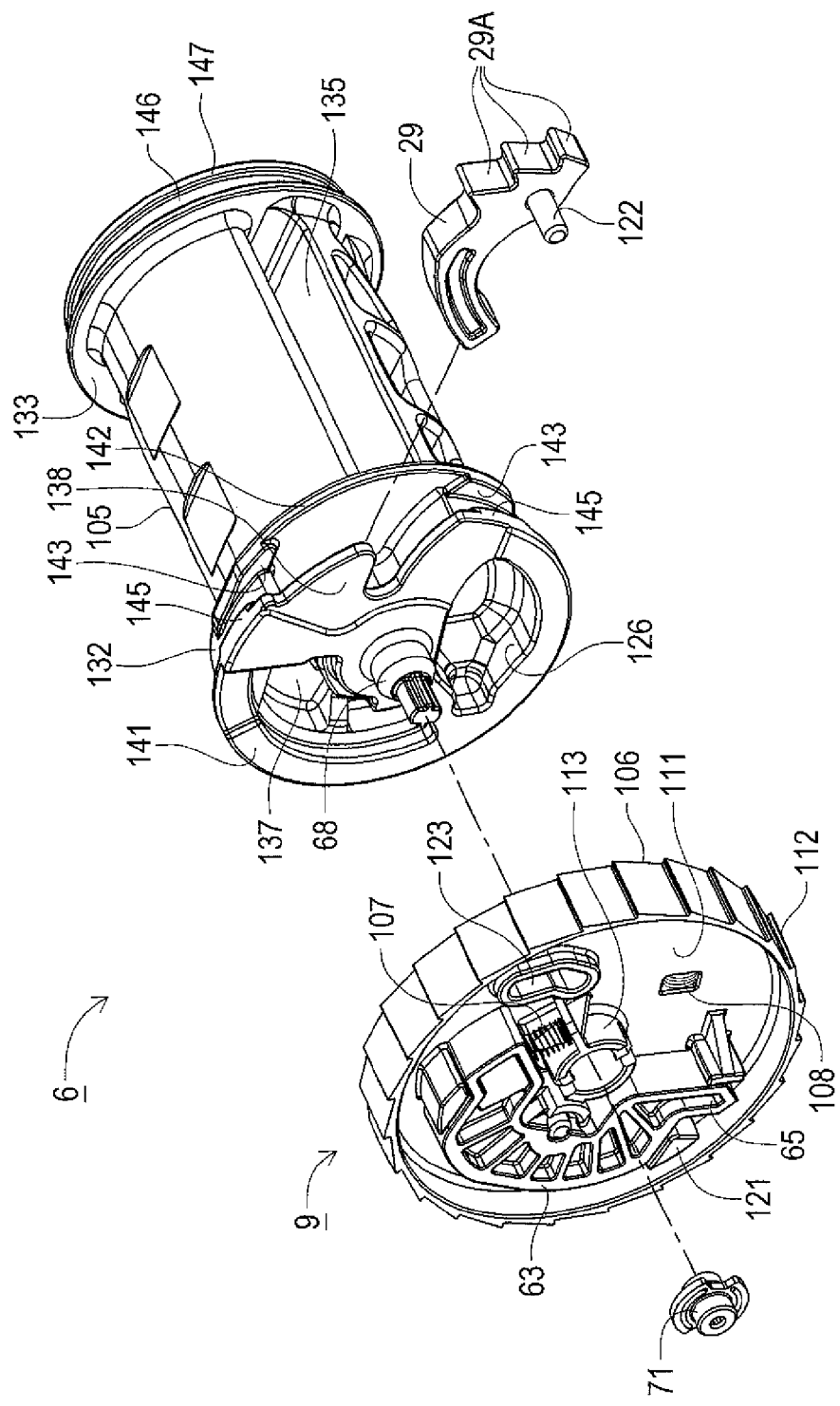
FIG. 18 is an exploded perspective view of a take-up drum unit.
Figure 19:
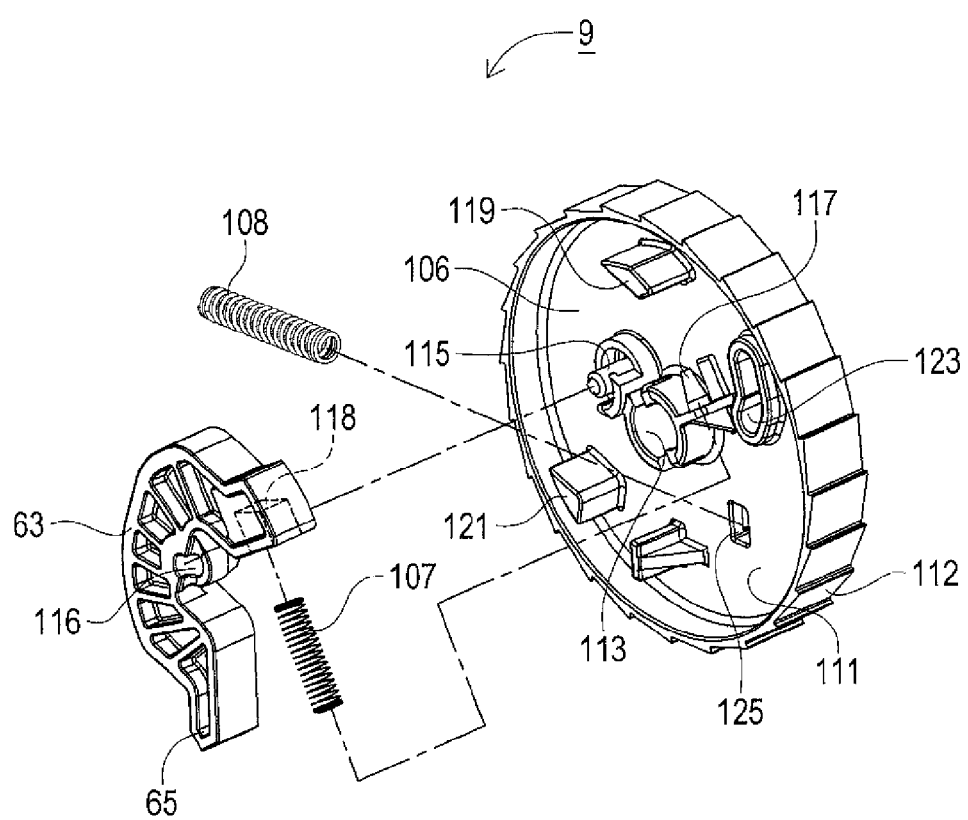
FIG. 19 is an exploded perspective view of a clutch unit.

Hereinafter, the schematic configuration of the take-up drum unit 6 will be described referring to FIGS. 2 through 4, 18 and 19. FIG. 18 is an exploded perspective view of the take-up drum unit 6. FIG. 19 is an exploded perspective view of the clutch unit 9.

As shown in FIGS. 2 through 4, 18 and 19, the take-up drum unit 6 includes a take-up drum 105 around which the webbing 3 is wound, the pawl 29 that engages with the engagement teeth 28A of the through hole 28 formed at the side wall portion 21 of the housing 15, the clutch unit 9, and the bearing cap 71. The clutch unit 9 includes the locking clutch 106, the locking arm 63, a sensor spring 107 and a return spring 108.

The locking clutch 106 is formed to project in an annular shape toward the mechanism cover 58 from the entire periphery of a disk-like bottom face portion 111 having a diameter larger than the outer diameter of the annular rib portion 62 of the mechanism cover 58. The clutch gear 112 is formed on the outer circumference of the locking clutch 106 and configured to engage with the locking claw 99 of the sensor lever 85 of the acceleration sensor 61. The configuration is such that the clutch gear 112 engages with the locking claw 99 of the sensor lever 85 only if the locking clutch 106 rotates in the webbing-pull-out direction (See FIG. 31).

The bottom face portion 111 of the locking clutch 106 has a boss 113 standing at the center portion thereof, on the mechanism cover 58 side. The boss 113 is communicating through the take-up drum 105 side. The bottom face portion 111 of the locking clutch 106 further has a pivot shaft 115 standing next to the boss 113, at a height approximately equal to that of the clutch gear 112. The locking arm 63 made of a synthetic resin is formed in a bow-like shape to surround the boss 113, and provided with a through hole 116 formed at the edge portion of the boss 113 side at an approximately center portion in longitudinal direction. The pivot shaft 115 is inserted into the through hole 116 to rotatably support the locking arm 63.

The bottom face portion 111 of the locking clutch 106 has a spring supporting pin 117 projecting on the rib portion extended radially outward from outer circumference of the boss 113. One end of the sensor spring 107 is fitted into the spring supporting pin 117, while the other end of the sensor spring 107 is fitted into a concave portion 118 formed on the end portion opposite to the engagement claw 65 of the locking arm 63.

Accordingly, the locking arm 63 is urged by a predetermined load to rotate in a webbing pull-out direction with regard to an axial center of the pivot shaft 115, and at an edge portion opposite to the engagement claw 65, makes contact with a stopper 119 formed on the bottom face portion 111. Meanwhile, as later described, if the locking arm 63 is rotated in the webbing pull-out direction against the urging force of the sensor spring 107 and engages with the locking gear 66, the outer edge portion of the engagement claw 65 is allowed to make contact with a rotation restrictor 121 formed in an approximately triangular shape in cross section, on the bottom face portion 111 of the locking clutch 106 (See FIG. 31).

The bottom face portion 111 of the locking clutch 106 further has a projecting guide groove 123 radially outside of the spring supporting pin 117. The projecting guide groove 123 slidably holds an interlocking pin 122 therein. The interlocking pin 122 projecting from the side face portion on a side closer to an engagement claw 29A of the pawl 29. The projecting guide groove 123 is formed such that the edge portion on the side of the webbing pull out direction gradually alienates from the center of the bottom face portion 111. Accordingly, as later described, if the clutch unit 9 is locked and only the take-up drum 105 rotates in the webbing pull out direction, the projecting guide groove 123 guides the pawl 29 radially outward to engage with the engagement teeth 28A of the through hole 28 (See FIG. 32).

Further, on the take-up drum 105 side of the bottom face portion 111 of the locking clutch 106, there is formed a spring fixing portion 125 so as to project axially toward the take-up drum 105 (See FIG. 3). The spring fixing portion 125 has a concave portion to which the one end of the return spring 108 is fitted. Accordingly, as shown in FIG. 18, in the clutch unit 9, the boss 113 is fitted to the base end portion of the mechanism-side shaft 68 with the one end of the return spring 108 fitted into the spring fixing portion 125, and the interlocking pin 122 of the pawl 29 is fitted to the projecting guide groove 123.

At the same time, in the clutch unit 9, under a state where the return spring 108 is compressed, the return spring 108 and the spring fixing portion 125 are arranged in a horizontally long fittable concave portion 126 formed on an edge surface of the take-up drum 105. The bearing cap 71 is inserted into a spline formed at the tip end portion of the mechanism-side shaft 68 projecting from the boss 113 of the clutch unit 9, and fixed in a relatively non-rotatable manner. Accordingly, in a normal state, the clutch unit 9 is pushed by the return spring 108 in the webbing pull out direction side and rotates together with the take-up drum 105 under a state where the pawl 29 is drawn inside the take-up drum 105.

[Schematic Configuration of Take-up Drum]

Figure 20:
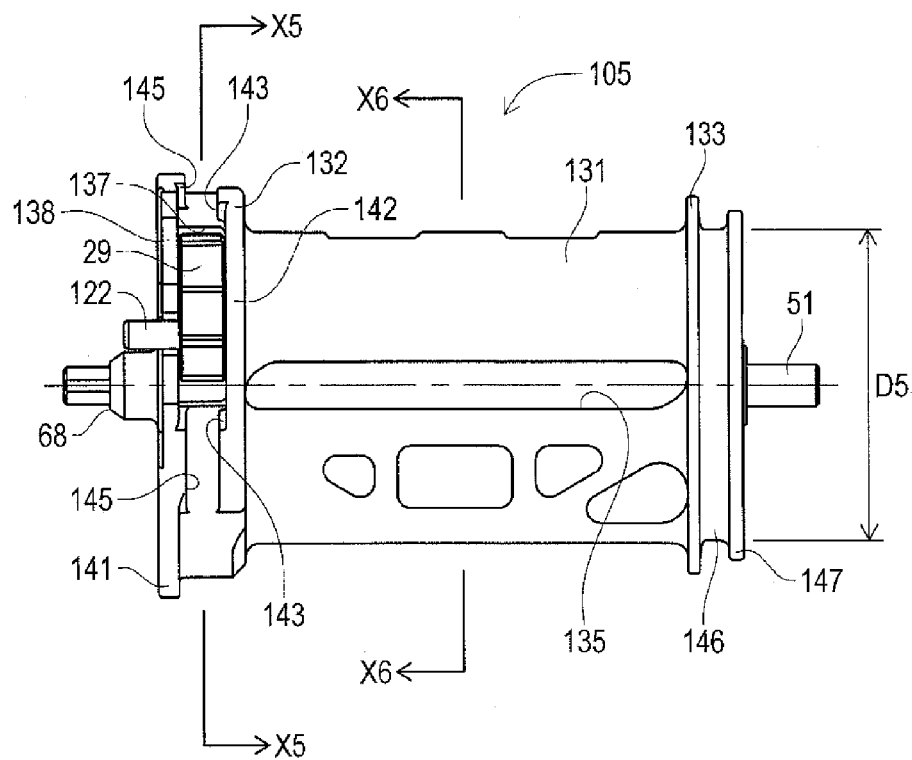
FIG. 20 is a front view illustrating a state where a pawl is inserted in the take-up drum.
Figure 21:
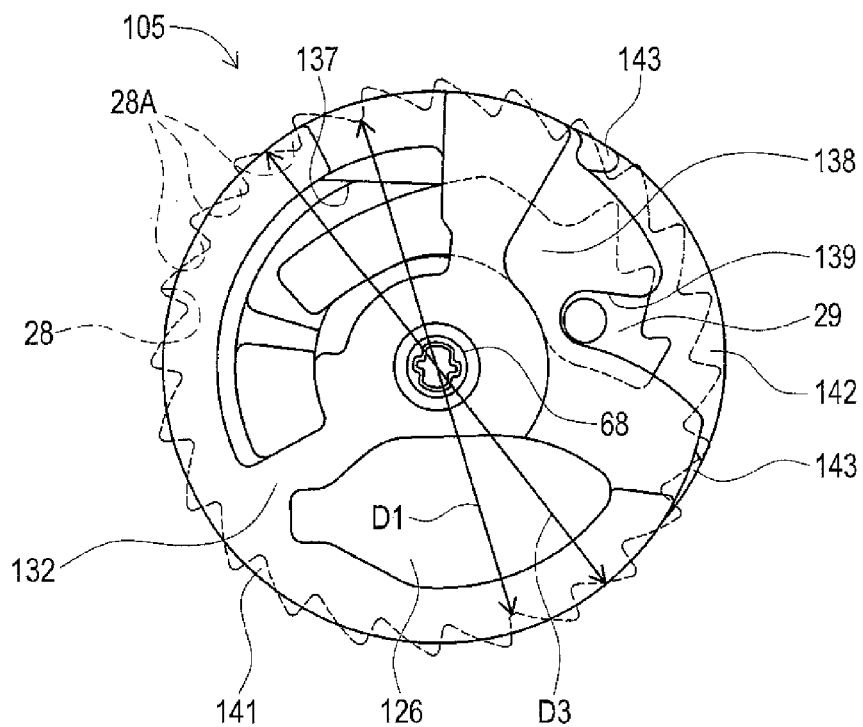
FIG. 21 is a left side view of FIG. 20.
Figure 22:
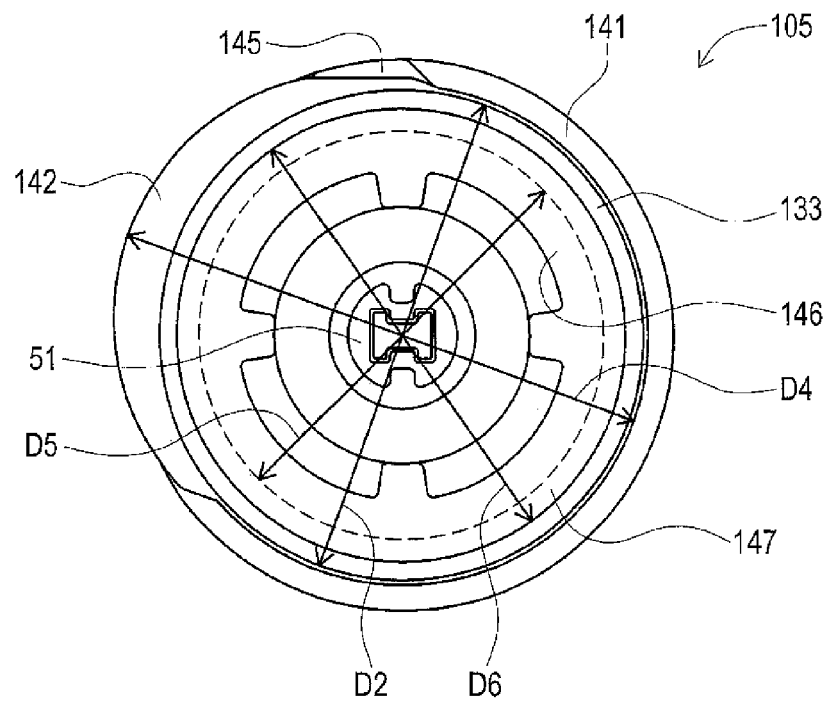
FIG. 22 is a right side view of FIG. 21.
Figure 23:
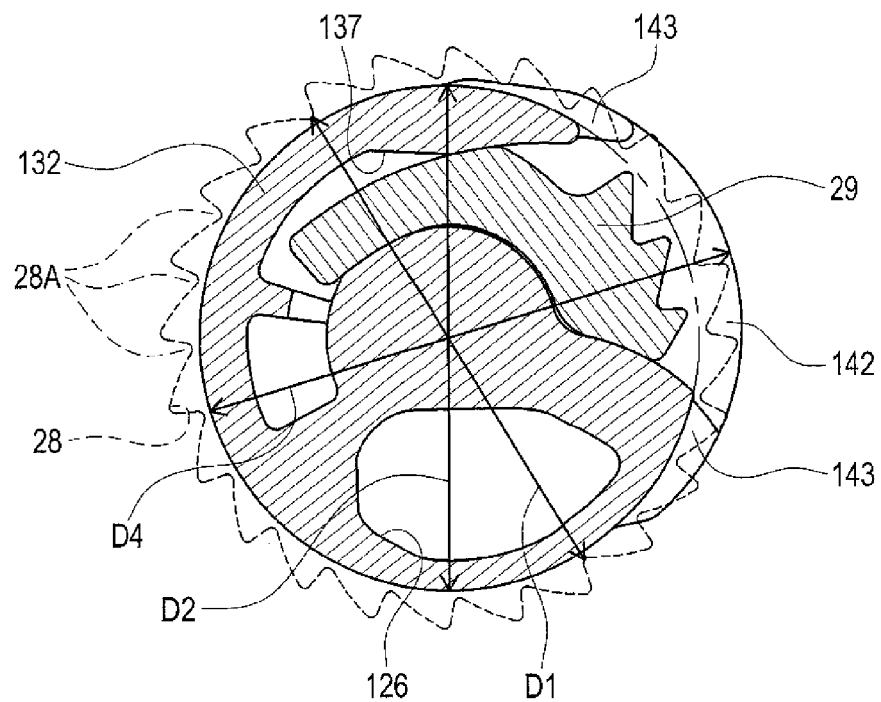
FIG. 23 is a cross sectional view taken along arrow X5-X5 in FIG. 20.
Figure 24:
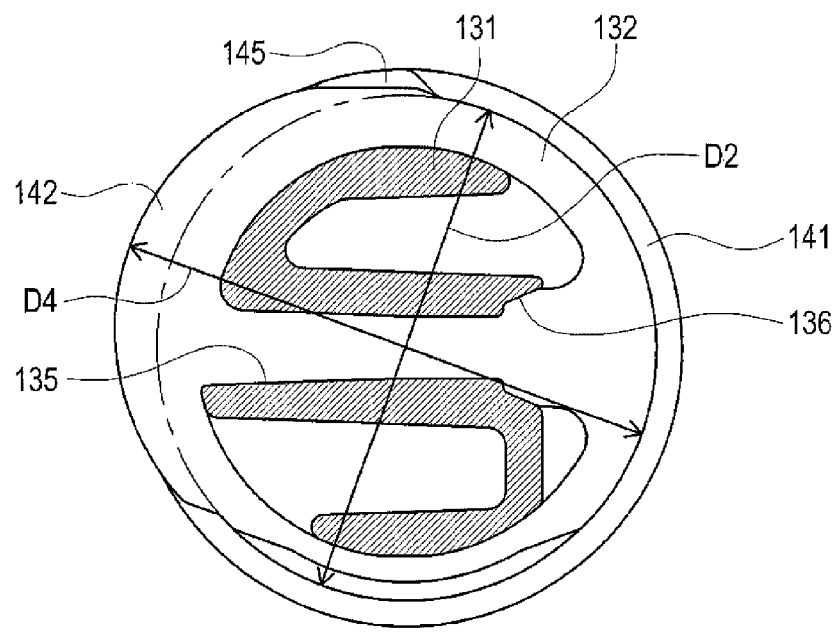
FIG. 24 is a cross sectional view taken along arrow X6-X6 in FIG. 20.

Next, there will be described on schematic configuration of the take-up drum 105 by referring to FIG. 3, FIG. 20 through FIG. 24. FIG. 20 is a front view illustrating a state where the pawl 29 is inserted in the take-up drum 105. FIG. 21 is a left side view of FIG. 20. FIG. 22 is a right side view of FIG. 20. FIG. 23 is a cross sectional view taken along arrow X5-X5 in FIG. 20. FIG. 24 is a cross sectional view taken along arrow X6-X6 in FIG. 20.

As shown in FIG. 22 through FIG. 24, the take-up drum 105 made of aluminum or the like includes a webbing-take-up portion 131 at axis directional center thereof. At both axis directional ends of the webbing take-up portion 131, namely at the side of mechanism cover unit 8 for regulating take-up and pull-out of the webbing 3 and at the side of the take-up spring unit 7, there are respectively arranged a mechanism-side flange portion 132 and a take-up-spring-side flange portion 133. In central portions at their respective axially outer end surfaces, there are arranged upright a mechanism-side shaft 68 on the mechanism-side flange portion 132 and a spring-side shaft 51 on the take-up spring-side flange portion 133.

As shown in FIG. 20 and FIG. 24, a slit 135 for allowing insertion of the webbing 3 is formed in the webbing take-up portion 131 so as to fully wide open between the mechanism-side flange portion 132 and the take-up-spring-side flange portion 133 and extend in diameter direction passing through rotation axis. The slit 135 includes an insertion port 136 from which the webbing 3 is inserted. More specifically, the insertion port 136 is formed widely expanding in symmetric with respect to the peripheral direction so that the slip-off prevention pin 12 can be set thereat and the webbing 3 wound on the slip-off prevention pin 12 can be positioned interior to outer peripheral surface of the webbing-take-up portion 131 on which the webbing 3 is wound.

As shown in FIG. 22 and FIG. 24, the mechanism-side flange portion 132 and the take-up-spring-side flange portion 133 are positioned coaxially with the rotation center of the webbing-take-up portion 131 and each formed in a circular shape with almost the same size. Further, both the mechanism-side flange portion 132 and the take-up-spring-side flange portion 133 each have major diameter D2 and as shown in FIG. 23, the major diameter D2 is set a little smaller than inner peripheral diameter D1 defined by tip ends of the engagement teeth 28A on the inner periphery of the through hole 28 formed in the side wall portion 21.

As shown in FIG. 20 through FIG. 24, the mechanism-side flange portion 132 includes: the fittable concave portion 126 for housing the return spring 108; and a bow-like-shaped pawl housing concave portion 137 for housing the pawl 29 interior to the outer periphery of the mechanism-side flange portion 132 and allowing the pawl 29 to pop out therefrom and return there inside. The fittable concave portion 126 and the pawl housing concave portion 137 are positioned so as to oppose to each other with reference to a radial direction of the mechanism-side flange portion 132. Further, the pawl housing concave portion 137 is formed to have depth almost the same as the thickness of the pawl 29 and covered by a pawl guiding flange 138 at an axially outer side thereof from which the pawl 29 is allowed to pop out.

On a peripheral edge of the pawl guiding flange 138, specifically the edge at a webbing-take-up direction side thereof, there is carved a guide groove 139 to concave toward axis center from an outer peripheral surface so that the interlocking pin 122 on a side surface of the pawl 29 is slidably settled therein. The interlocking pin 122 settled in and projecting from the guide groove 139 is movably placed in the projecting guide groove 123 of the locking clutch 106.

Along a peripheral edge portion exterior to the mechanism-side flange portion 132 with respect to axial direction, there is arranged a displacement prevention flange 141 having a substantially C shape when seen from the front, so as to works as example of a brim part. More specifically, the displacement prevention flange 141 is configured to extend radially outward from periphery of the pawl housing concave portion 137 except for an opening portion thereof provided for the pawl's exit. As shown in FIG. 21, major diameter D3 of the displacement prevention flange 141 is set larger than the inner peripheral diameter D1 defined by tip ends of the engagement teeth 28A on the inner periphery of the through hole 28 formed in the side wall portion 21. Accordingly, in a state where rotation axis of the take-up drum 105 and center axis 28B of the through hole 28 in the side wall portion 21 align, the displacement prevention flange 141 of which axially inner surface faces the engagement teeth 28A is configured to project radially outward over the inner peripheral diameter D1 defined by tip ends of the engagement teeth 28A.

On a peripheral edge portion of the mechanism-side flange portion 132 at a side facing the webbing-take-up portion 131, as example of a projecting portion, there is formed a projecting flange 142 so as to project like an arch toward pop-out direction of the pawl 29, from the periphery of the pawl housing concave portion 137 including the opening portion thereof for the pawl's exit, namely, from the peripheral edge area that faces the pawl 29 when the pawl 29 moves to reach a position to get engaged with the engagement teeth 28A. Further, the pawl-side surface of the projecting flange 142 and the bottom surface of the pawl housing concave portion 137 are on the same plane, whereby a side surface portion of the pawl 29 can move and slide smoothly.

As shown in FIG. 23, maximum outer dimension D4 formed by the projecting flange 142 and the mechanism-side flange portion 132 is set larger than the inner peripheral diameter D1 defined by tip ends of the engagement teeth 28A on the inner periphery of the through hole 28 formed in the side wall portion 21. Accordingly, in the state where rotation axis of the take-up drum 105 and center axis 28B of the through hole 28 in the side wall portion 21 align, the projecting flange 142 of which axially outer surface faces the engagement teeth 28A is configured to project radially outward over the inner peripheral diameter D1 defined by tip ends of the engagement teeth 28A.

As shown in FIG. 20 through FIG. 23, at both peripheral outer sides with respect to the opening portion of the pawl housing concave portion 137 on the axially outer surface of the projecting flange 142, inner stepped portions 143 are arranged so as to swell up in axial-outward direction by height (for instance, approximately 1 mm high) that is shorter than thickness of the pawl 29 (refer to FIG. 18). In the state where rotation axis of the take-up drum 105 and center axis 28B of the through hole 28 in the side wall portion 21 align, the inner stepped portions 143 arranged at the both peripheral outer sides of the projecting flange 142, of which axially outer surface faces the engagement teeth 28A, are configured to project radially outward over the inner peripheral diameter D1 defined by tip ends of the engagement teeth 28A.

Further, at both peripheral outer sides with respect to the opening portion of the pawl housing concave portion 137 on the axially inner surface of the displacement prevention flange 141, particularly at the portions facing the inner stepped portions 143, outer stepped portions 145 are arranged so as to swell up in axial-inward direction by height (for instance, approximately 1 mm high) that is shorter than thickness of the pawl 29 (refer to FIG. 18). Accordingly, as shown in FIG. 20 and FIG. 23, the pawl 29 is allowed to move the space between the inner stepped portions 143 and the outer stepped portion 145 so as to reach the engagement position at which the pawl 29 gets engaged with the engagement teeth 28A formed on the inner periphery of the through hole 28 (refer to FIG. 32).

As shown in FIG. 3, FIG. 20 and FIG. 22, on the axially outer end portion of the take-up-spring-side flange portion 133 having major diameter D2, a substantially annular rib portion 146 is erected so as to reach a position axially exterior to the side wall portion 22 in the state where rotation axis of the take-up drum 105 and center axis 28B of the through hole 28 in the side wall portion 21 align. Further, major diameter D5 of the substantially annular rib portion 146 is set smaller than inner peripheral diameter of radius R1, which is defined by tip ends of V-shaped projections 39 on an inner periphery of the semicircular opening portion 36 formed in the side wall portion 22 (refer to FIG. 29).

Further, as example of an other-side brim part, an outer flange 147 having an annular shape when seen from the front is arranged so as to extend radially outward along entire periphery from the axially outer peripheral edge of the annular rib portion 146. Further, major diameter D6 of the outer flange 147 is set lager than the inner peripheral diameter of radius R1, which is defined by tip ends of the V-shaped projections 39 on an inner periphery of the semicircular opening portion 36 formed in the side wall portion 22, and almost the same as inner peripheral diameter of the semicircular opening portion 36.

Accordingly, as will be later described, in the state where rotation axis of the take-up drum 105 and center axis 28B of the through hole 28 in the side wall portion 21 align, the outer flange 147 of which axially inner surface faces the semicircular opening portion 36 is configured to project radially outward over the inner peripheral diameter of radius R1, which is defined by tip ends of the V-shaped projections 39 on the inner periphery of the semicircular opening portion 36 (refer to FIG. 29). As will be later described, the outer flange 147 can go into the enlarged opening portion 37 formed in the side wall portion 22 (refer to FIG. 27).

Next, there will be described on a method for inserting the take-up drum unit 6 in a space between the side wall portions 21 and 22 of the housing 15 by referring to FIG. 25 through FIG. 30. FIG. 25 through FIG. 30 are views for illustrating the method for inserting the take-up drum unit 6 into the housing 15.

Figure 25:
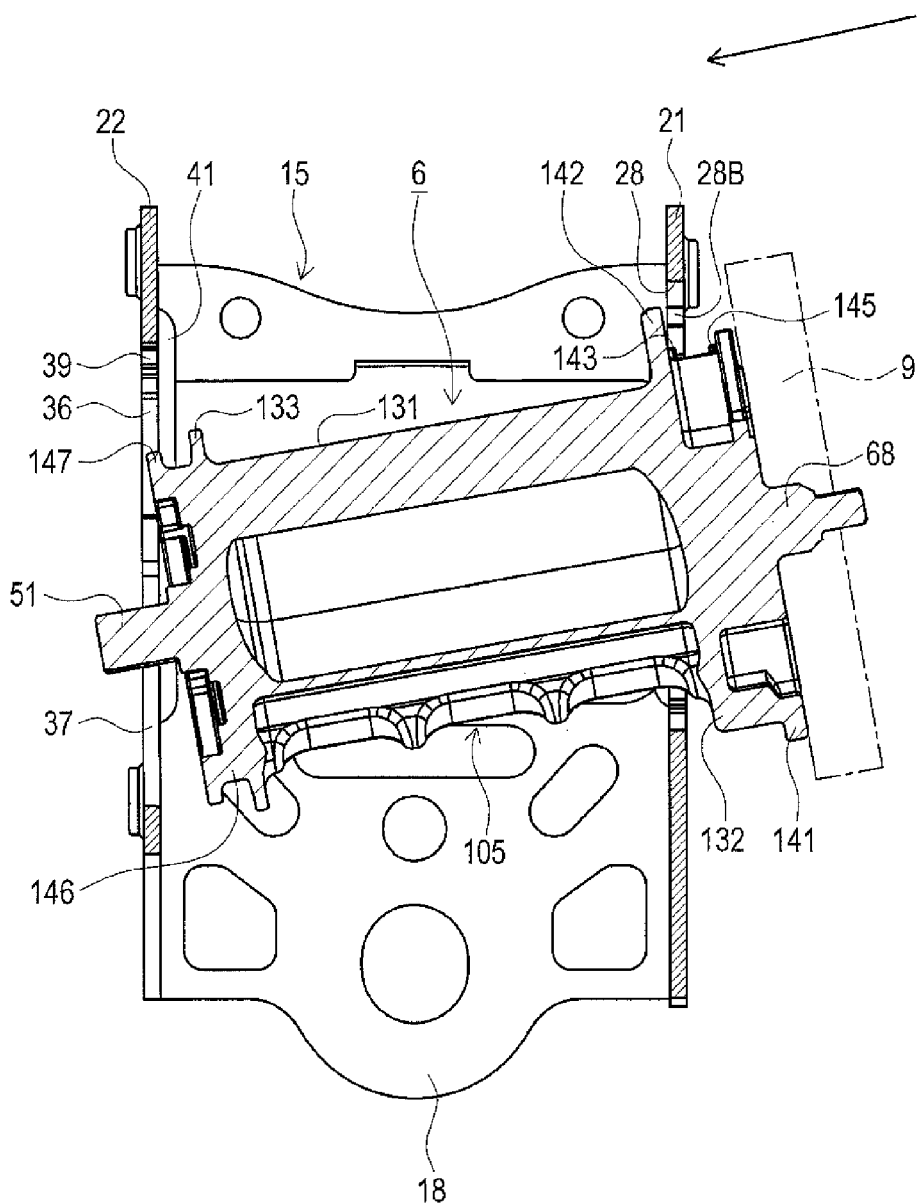
FIG. 25 is a cross sectional view for illustrating a method for inserting the take-up drum into the housing.
Figure 26:
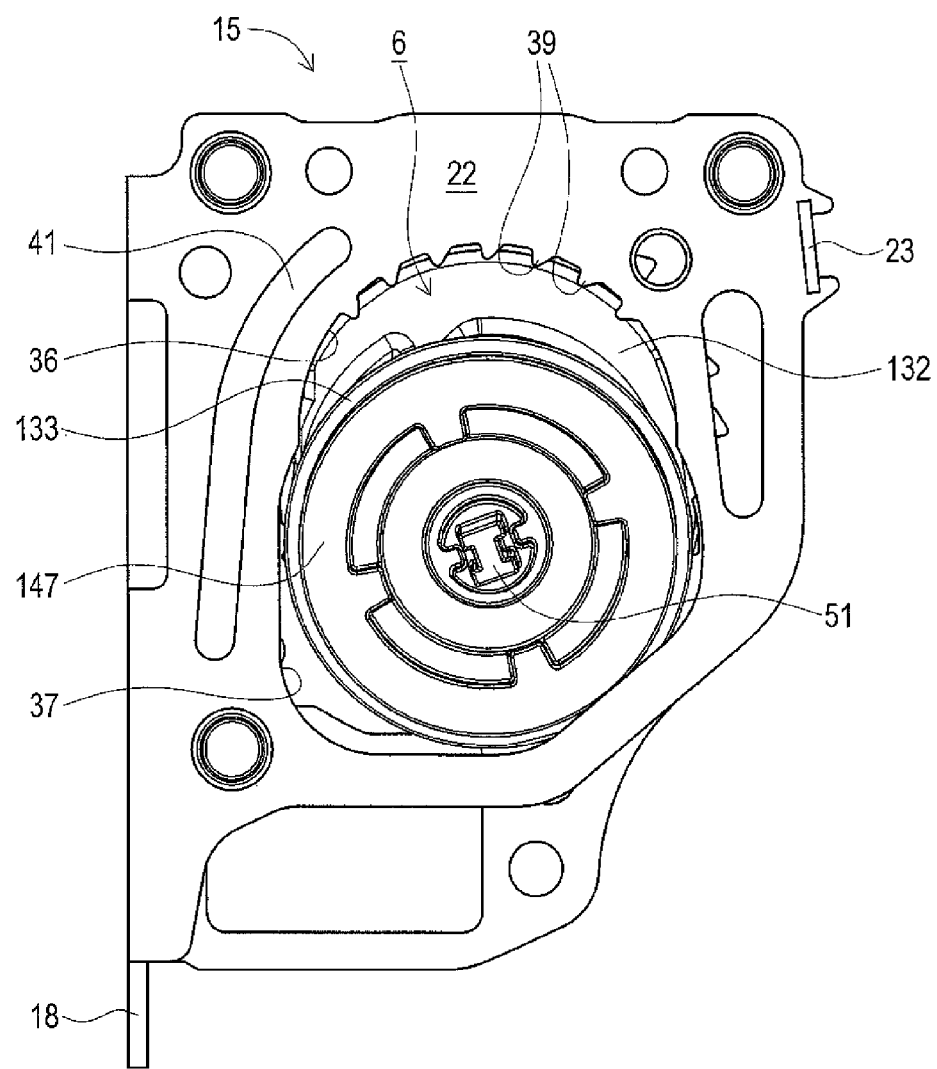
FIG. 26 is a left side view of FIG. 25.

As shown in FIG. 25 and FIG. 26, the clutch unit 9 mounted on the take-up drum unit 6 is held so as to put vertically upward the substantially peripheral center part of the projecting flange 142 formed on the mechanism-side flange portion 132 of the take-up drum 105.

Next, in a state where the take-up drum unit 6 is inclined with the take-up-spring-side flange portion 133 down and the mechanism-side flange portion 132 up, the take-up-spring-side flange portion 133 is inserted into the housing 15 from the through hole 28 formed in the side wall portion 21 of the housing 15 and subsequently the projecting flange 142 is inserted therein from the through hole 28. Incidentally, the spring-side shaft 51 of the take-up drum 105 projects a bit outside from the enlarged opening portion 37 of the through hole 38 formed in the side wall portion 22.

Figure 27:
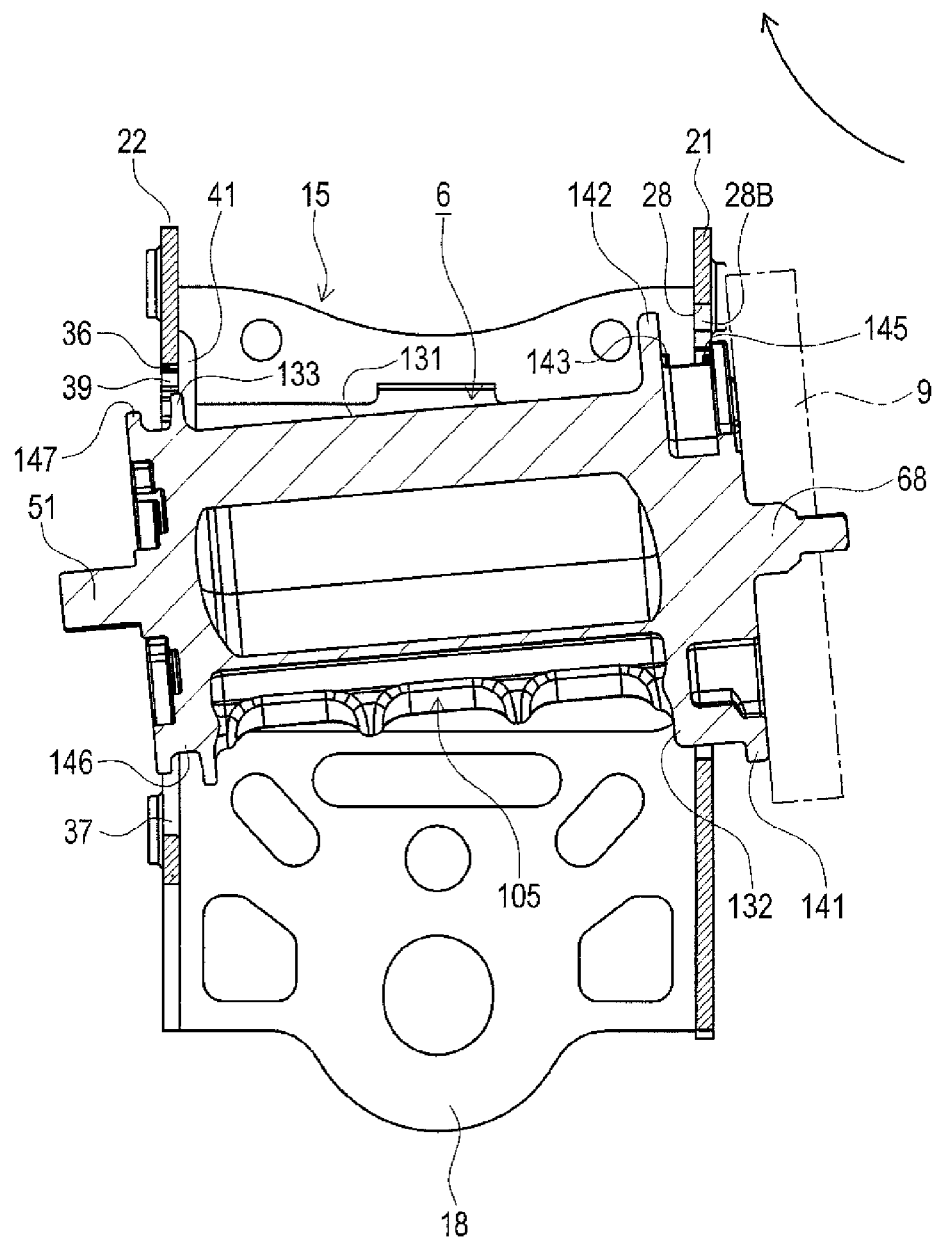
FIG. 27 is a cross sectional view for illustrating a method for inserting the take-up drum into the housing.
Figure 28:
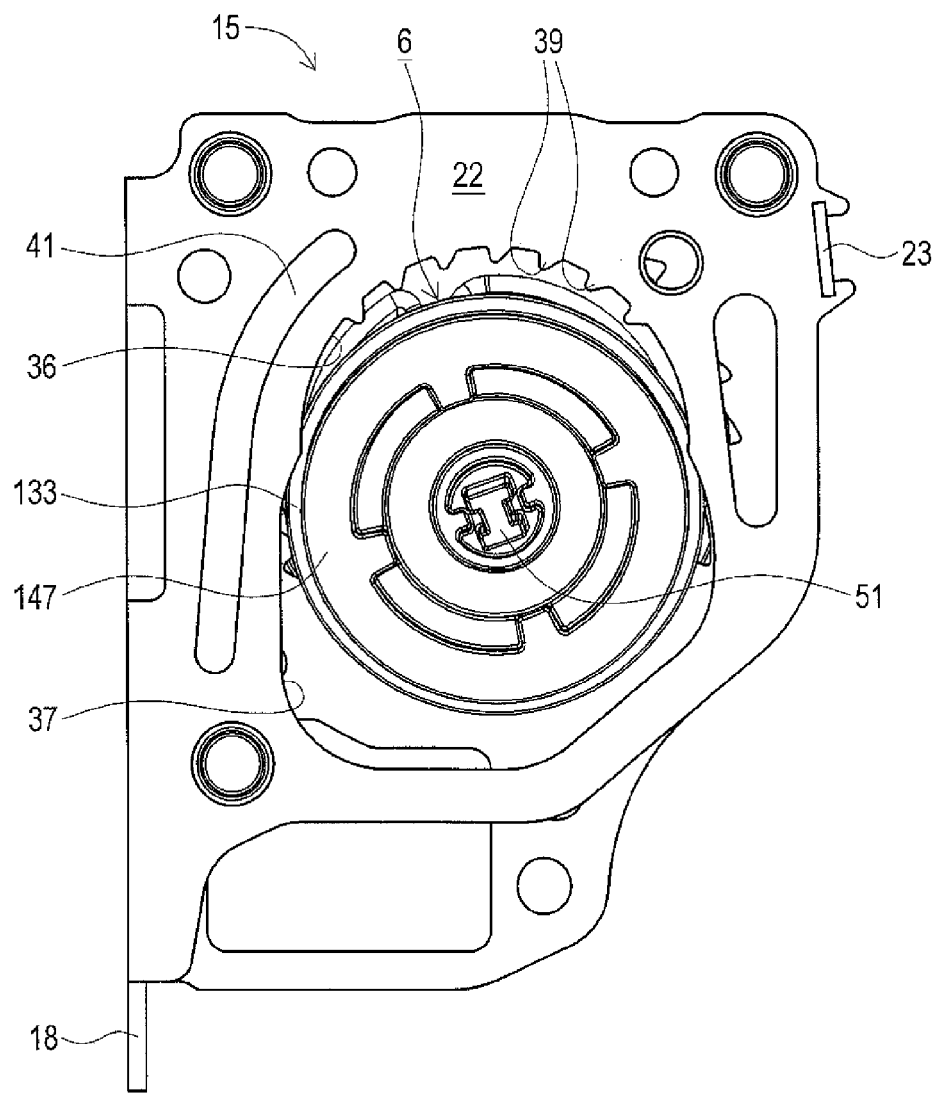
FIG. 28 is a left side view of FIG. 27.

Next, as shown in FIG. 27 and FIG. 28, in a state where the take-up drum unit 6 is inclined with the take-up-spring-side flange portion 133 down and the mechanism-side flange portion 132 up, the take-up drum 6 is lifted up a bit and further inserted in the through hole 28 of the wall portion 21 so that the mechanism-side flange portion 132 is put inside of the housing 15. At this stage, the upper-side peripheral edge portion of the displacement prevention flange 141 arranged on the axially outer end portion of the mechanism-side flange portion 132 is placed so as to get in touch with the outer-side surface of the side wall portion 21.

Also, in a state of being inclined downward, the outer flange 147 and the take-up-spring-side flange portion 133 of the take-up drum 105 are inserted in a communicating area of the semicircular opening portion 36 and the enlarged opening portion 37 which integrally make up the through hole 38 in the side wall portion 22. Accordingly, the upper-side peripheral edge portion of the outer flange portion 147 is placed so as to project from the semicircular opening portion 36 of the side wall portion 22.

Figure 29:
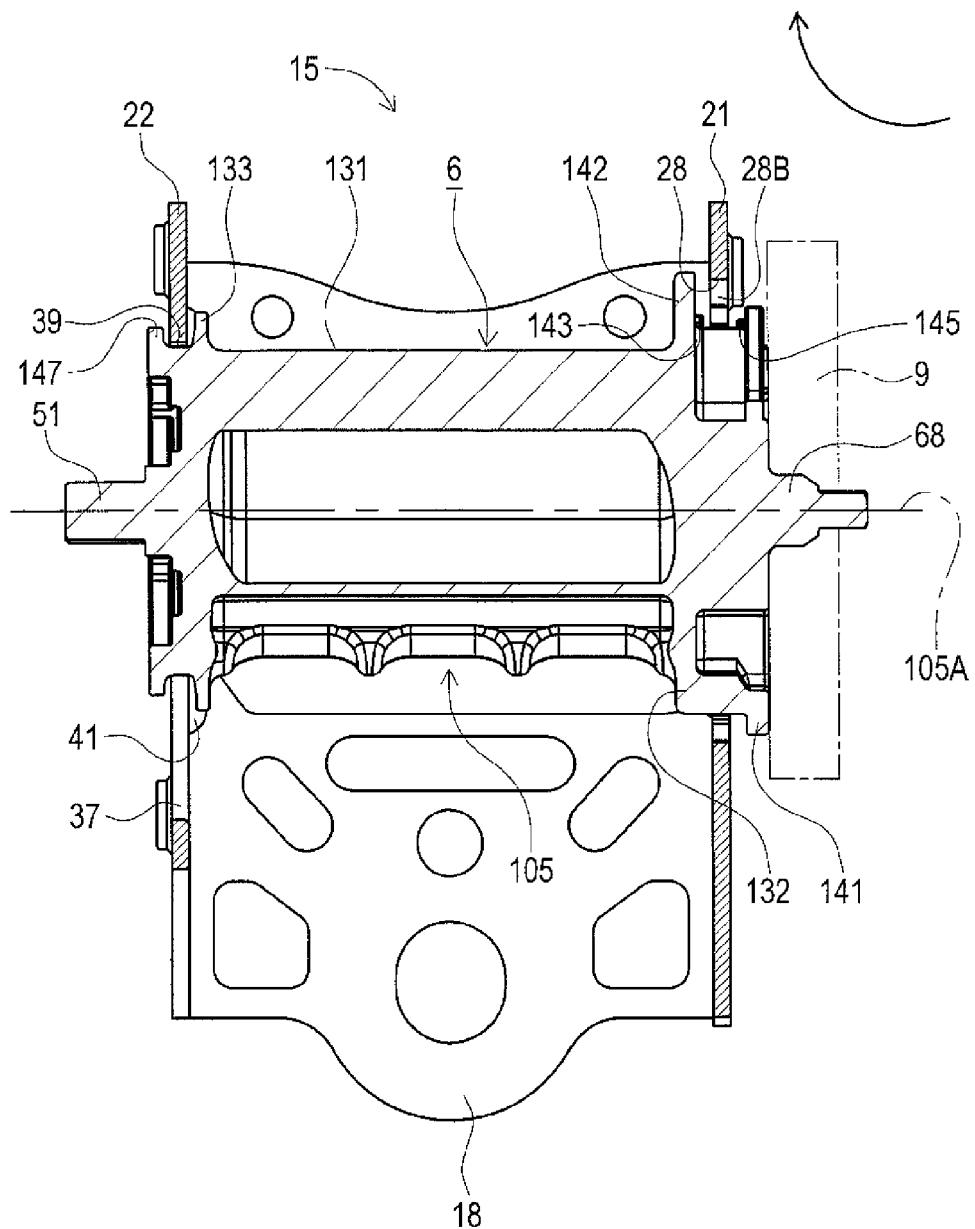
FIG. 29 is a cross sectional view for illustrating a method for inserting the take-up drum into the housing.
Figure 30:
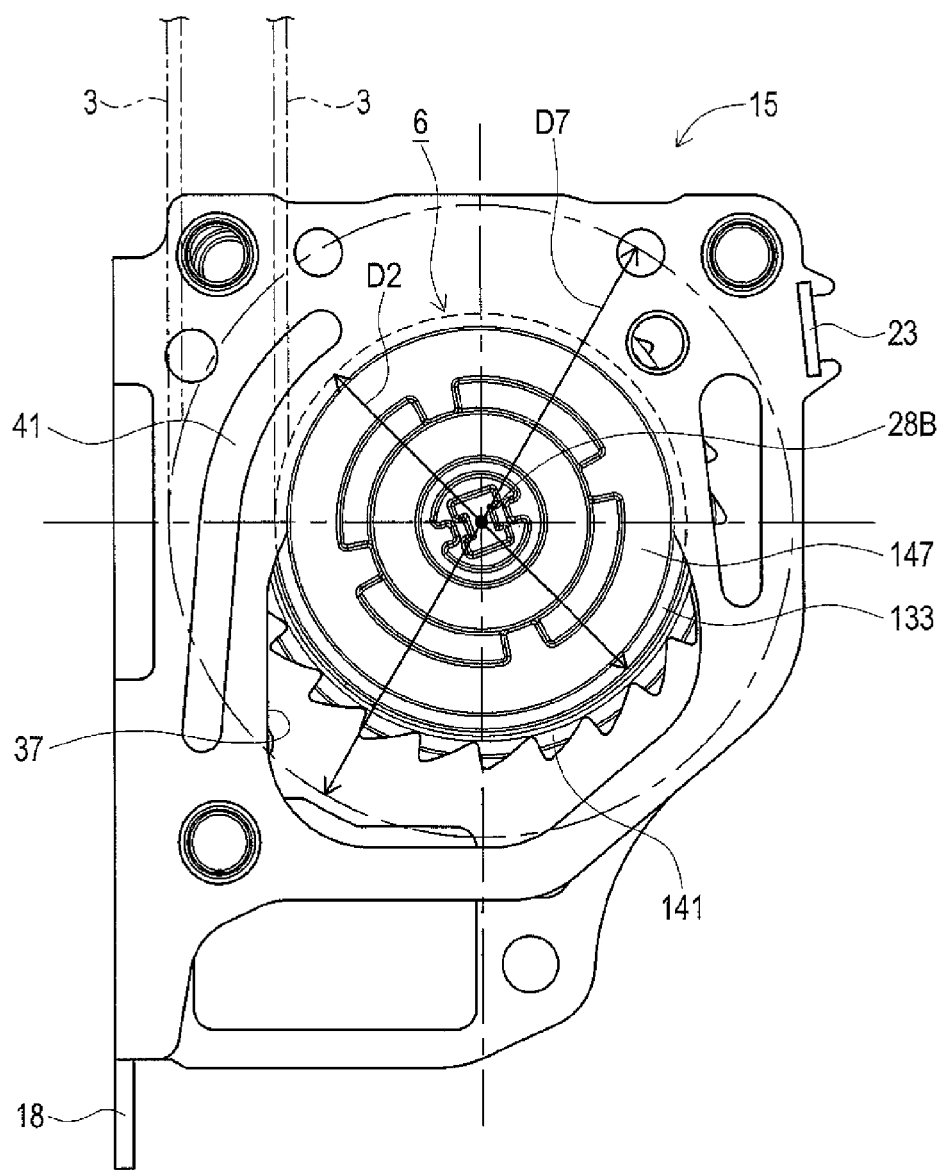
FIG. 30 is a left side view of FIG. 29.

As shown in FIGS. 29 and 30, by lifting up the outer flange 147 and the take-up-spring-side flange portion 133 of the take-up drum 105, the take-up drum 105 is set substantially horizontal so that the rotation axis 105A of the take-up drum 105 and center axis 28B of the through hole 28 in the side wall portion 21 align. Thereby, as shown in FIG. 3, the mechanism-side shaft 68 and the spring-side shaft 51 of the take-up drum unit 6 are rotatably supported by the mechanism cover unit 8 and the take-up spring unit 7, respectively.

Thereby, the projecting flange 142 on the mechanism-side flange portion 132 is positioned so as to project exterior to the inner peripheral diameter D1 defined by tip ends of the engagement teeth 28A on the inner periphery of the through hole 28 formed in the side wall portion 21 while the mechanism-side flange portion 132 is positioned interior to the inner peripheral diameter D1 defined by tip ends of the engagement teeth 28A. Further, the outer peripheral portion of the displacement prevention flange 141 on the mechanism-side flange portion 132 is positioned so as to project exterior to the inner peripheral diameter D1 defined by tip ends of the engagement teeth 28A.

Further, the inner stepped portions 143 arranged at both sides on the axially outer surface of the projecting flange 142 and the outer stepped portions 145 arranged at both sides on the axially inner surface of the displacement prevention flange 141 are positioned so as to face one of side surfaces of the engagement teeth 28A and project exterior to the inner peripheral diameter D1 defined by tip ends of the engagement teeth 28A. Further, the take-up-spring-side flange portion 133 and the outer flange 147 are configured to project over the inner peripheral diameter of radius R1, which is defined by tip ends of the V-shaped projections 39 on the inner periphery of the semicircular opening portion 36 that is a part of the through hole 38 in the side wall portion 22. Further, the outer periphery of the rib portion 146 erected on the axially outer side of the take-up-spring-side flange portion 133 is positioned interior to the inner peripheral diameter of radius R1, which is defined by tip ends of the V-shaped projections 39 on the inner periphery of the semicircular opening portion 36.

Further, the reinforcement groove 41 having a substantially semicircular concave in cross section is formed along a peripheral edge portion of the through hole 38 on the side wall portion 22, the through hole 38 consisting of the semicircular opening portion 36 and the enlarged opening portion 37. As shown in FIG. 4, FIG. 29 and FIG. 30, the concave portion of the thus configured reinforcement groove 41 protrudes toward inner side of the side wall portion 22 (rightward in FIG. 4) by depth so as to almost reach the level of the axially inner surface of the take-up-spring-side flange portion 133 on the take-up drum 105. Further, the reinforcement groove 41 on the side wall portion 22 is positioned so that the side edge portion of the webbing 3 taken up on the webbing-take-up portion 131 of the take-up drum 105 faces the reinforcement groove 41 when diameter of the webbing 3 rolled and taken up on the webbing-take-up portion 131 comes to the same as the major diameter D2 of the take-up-spring-side flange portion 133.

Also, the reinforcement groove 41 on the side wall portion 22 is formed along peripheral edge portion of the enlarged opening portion 37 so that one of the side edge portions of the webbing 3 taken up on the webbing-take-up portion 131 of the take-up drum 105 faces the reinforcement groove 41 when diameter of the webbing 3 rolled and taken up on the webbing-take-up portion 131 comes to its maximum rolled-up diameter D7. Accordingly, when the webbing 3 is pulled out or taken up, the one side edge portion thereof facing the side wall portion 22 is made contact with either the axially inner surface of the take-up-spring-side flange portion 133 or the reinforcement groove 41. Thereby, the webbing 3 is taken up on the webbing-take-up portion 131 in order so that the side edge portion of the webbing 3 should not get tangled on the take-up-spring-side flange portion 133.

[Operation of Lock Mechanism]

Figure 31:
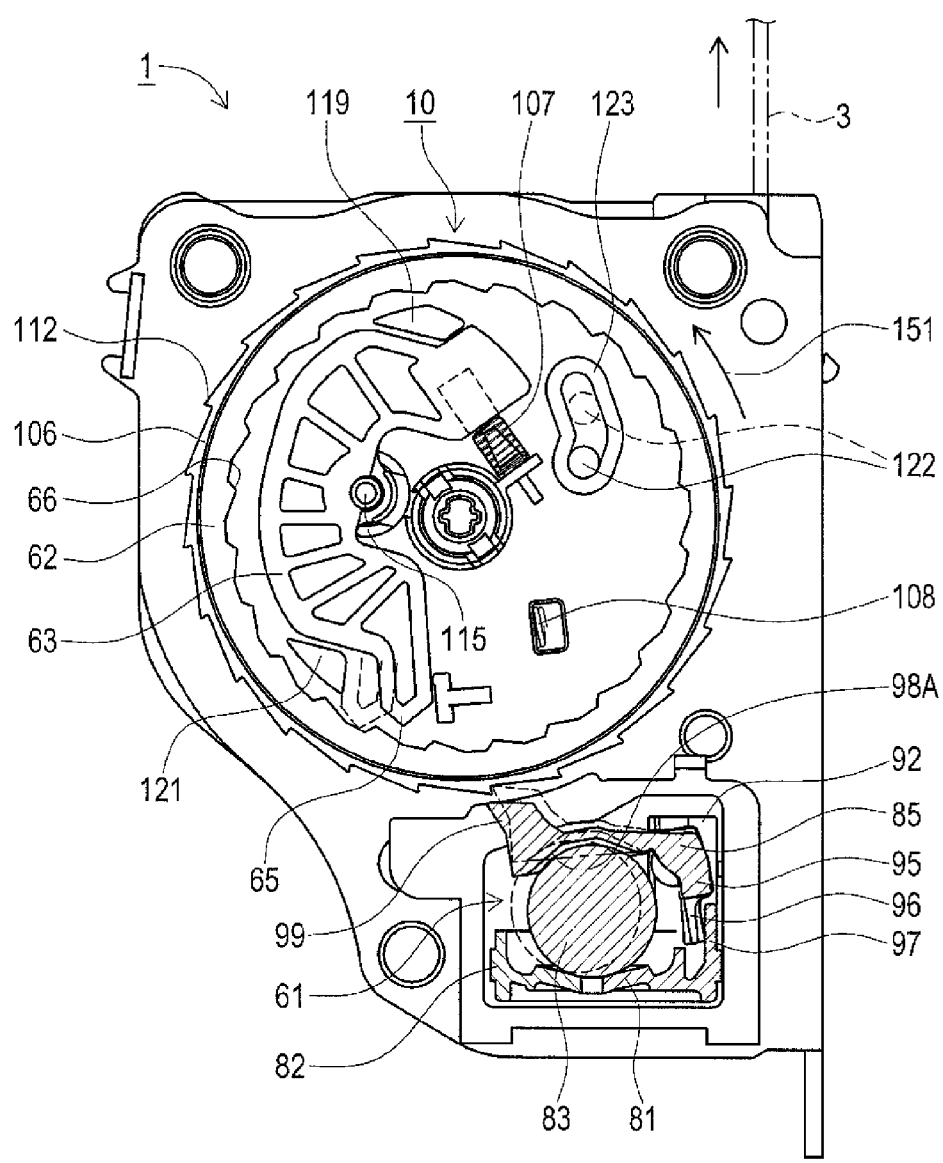
FIG. 31 is a view for illustrating operation of a locking mechanism.
Figure 32:
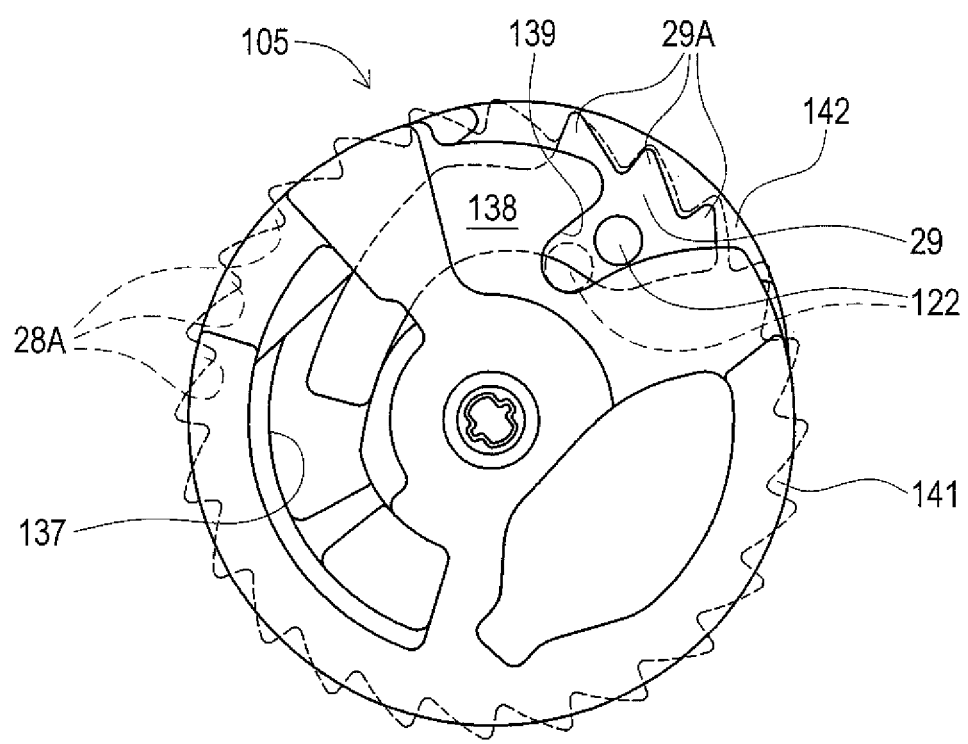
FIG. 32 is a side view of the pawl in a locked state.

Next, the operation of the lock mechanism 10 will be described referring to FIG. 31 and FIG. 32. FIG. 31 is a view for illustrating operation of a lock mechanism. FIG. 32 is a side view of a locked state in which the pawl 29 gets engaged with the engagement tooth 28A.

The operation types of the lock mechanism 10 are classified into "webbing-sensitive lock mechanism" to stop pulling out the webbing 3 when the webbing 3 is pulled out abruptly and "vehicle-body-sensitive lock mechanism" to stop pulling out the webbing in response to abrupt acceleration change in a vehicle.

[Description of Operation in Webbing-sensitive Lock Mechanism]

First, the operation of the webbing-sensitive lock mechanism will be described.

As illustrated in FIG. 31 and FIG. 32, the locking arm 63 is rotatably supported by the pivot shaft 115 of the locking clutch 106. Therefore, when the acceleration to pull out the webbing 3 exceeds a predetermined acceleration (for instance, approximately 2.0 G, regarding 1 G≈9.8 m/s²), an inertial delay is generated in the locking arm 63, to the rotation of the locking clutch 106 in the webbing pull-out direction (direction of arrow 151).

As a result, the locking arm 63 abutting on the stopper 119 maintains the initial position against the urging force of the sensor spring 107, rotates in a direction opposite to the webbing-pull-out direction (clockwise in FIG. 31) centering the pivot shaft 115 with regard to the locking clutch 106, until making contact with the rotation restrictor 121. Accordingly, the engagement claw 65 of the locking arm 63 is rotated radially outward with regard to the rotational axis of the locking clutch 106, and gets engaged with the lock gear 66 of the rib portion 62 of the mechanism cover 58. Thereby, integrated rotation of the locking clutch 106 and the take-up drum 105 is stopped.

When the pull-out of the webbing 3 is continued exceeding the predetermined acceleration, the interlocking pin 122 erected on the side surface of the pawl 29 slides and moves in the projecting guide groove 123 along rotation of the take-up drum 105. Along the sliding movement, the interlocking pin 122 slides and moves within the guide groove 139 formed in the pawl guiding flange 138 of the take-up drum 105 so as to move radially outward in a projecting manner. Subsequently, the engagement claws 29A get engaged with the engagement teeth 28A formed on the inner periphery of the through hole 28 in the side wall portion 21. Thereby, rotation of the take-up drum 105 is stopped and pull-out of the webbing 3 is stopped.

When the abrupt pull-out of the webbing 3 is stopped, the locking arm 63 is brought back to its initial position so as to get in contact with the stopper 119 by urging force of the sensor spring 107. Consequently, there is released the engagement between the engagement claw 65 of the locking arm 63 and the locking gear 66 at the rib portion 62 of the mechanism cover 58. After that, the locking clutch 106 is relatively rotated in the webbing-pull-out direction (in arrow 151 direction) with respect to the take-up drum 105 by the urging force of the return spring 108. The relative rotation of the locking clutch 106 causes the interlocking pin 122 to slide and move in the projecting guide groove 123 so as to return the interlocking pin 122 to its initial position shown in FIG. 31.

Along the sliding movement, the interlocking pin 122 slides and moves within the guide groove 139 formed in the pawl guiding flange 138 of the take-up drum 105 so as to move radially inward in a drawn-in manner. Consequently, the pawl 29 is moved and housed in the pawl housing concave portion 137 and thus, the pawl 29 is housed in the mechanical-side flange portion 132 in an embedded manner. Thereby, integrated rotation of the locking clutch 106 and the take-up drum 105 is started so as to bring the take-up drum 105 back to the condition to be able to pull out and take up the webbing 3.

[Description of Operation in Vehicle-body-sensitive Lock Mechanism]

Next, the operation of the "vehicle-body-sensitive lock mechanism" will be described.

As illustrated in FIG. 31 and FIG. 32, the spherical inertia mass 83 of the acceleration sensor 61 is placed on a bowl-like mounting portion 81 of the sensor holder 82, and moves on the mounting portion 81 to make contact with and push a contact portion 98A of the sensor lever 85 upward, if the acceleration due to rocking or tilting of the vehicle body caused by collision or abrupt braking of a vehicle exceeds the predetermined acceleration (for instance, approximately 0.4 G).

After that, the sensor lever 85 is pushed upward by the inertia mass 83, which causes the locking claw 99 of the sensor lever 85 to pop out from the opening portion 77 of the mechanism cover 58. Consequently, the locking claw 99 gets engaged with the clutch gear 112 formed on the outer periphery of the locking clutch 106. Thereby, integrated rotation of the locking clutch 106 and the take-up drum 105 is stopped. Therefore, when the webbing 3 shoulders a load in the webbing-pull-out direction, the take-up drum 105 rotates in the webbing-pull-out direction (in arrow 151 direction) against urging force of the return spring 108.

Along rotation of the take-up drum 105, the interlocking pin 122 erected on the side surface of the pawl 29 slides and moves in the projecting guide groove 123. Along the sliding movement, the interlocking pin 122 slides and moves within the guide groove 139 formed in the pawl guiding flange 138 of the take-up drum 105 so as to move radially outward in a projecting manner. Subsequently, the engagement claws 29A get engaged with the engagement teeth 28A formed on the inner periphery of the through hole 28 in the side wall portion 21. Thereby, rotation of the take-up drum 105 is stopped and pull-out of the webbing 3 is stopped.

When the abrupt acceleration change in the vehicle is stopped, the inertial mass 83 is caused to move on the mounting portion 81 of the sensor holder 82 due to gravity and brought back to the center position of the mounting portion 81. When the webbing 3 is released from the load in the webbing-pull-out direction, the locking clutch 106 is relatively rotated in the webbing-pull-out direction (in arrow 151 direction) with respect to the take-up drum 105 by the urging force of the return spring 108. The relative rotation of the locking clutch 106 causes the interlocking pin 122 to slide and move in the projecting guide groove 123 so as to return the interlocking pin 122 to its initial position shown in FIG. 31.

At the same time, the sensor lever 85 is rotated downward by self-weight so that the contact lever 96 extending downward from the extending portion 95 formed at one end of the sensor lever 85 is brought into contact with an inner surface of the regulating wall portion 97 of the sensor holder 82. Thereby, an internal clearance 102 is formed between the inertial mass 83 and a contact portion 98A (refer to FIG. 13). Incidentally, the locking claw 99 of the sensor lever 85 is rotated downward and housed inside of the opening portion 77 of the mechanism cover 58.

Concurrently with sliding movement within the projecting guide groove 123, the interlocking pin 122 slides and moves within the guide groove 139 formed in the pawl guiding flange 138 of the take-up drum 105 so as to move radially inward in a drawn-in manner. Consequently, the pawl 29 is moved and housed in the pawl housing concave portion 137 and thus, the pawl 29 is housed in the mechanical-side flange portion 132 in an embedded manner. Thereby, integrated rotation of the locking clutch 106 and the take-up drum 105 is started so as to bring the take-up drum 105 back to the condition to be able to pull out and take up the webbing 3.

As described in the above, in the seatbelt retractor 1 of the present embodiment, the lock mechanism 10 gets activated in response to abrupt pull-out of the webbing 3 or abrupt acceleration of vehicle speed so as to stop the take-up drum 105 from rotating in webbing-pull-out direction. Even if the lock mechanism 10 stops the take-up drum 105 from rotating in the webbing-pull-out direction and the webbing 3 applies the take-up drum 105 a load working toward the pawl 29 with respect to axial direction, the projecting flange 142 projecting radially outward from the mechanism-side flange portion 132 is positioned such that its axially outer surface faces the engagement teeth 28A. Thereby, the projecting flange 142 can surely prevent significant misalignment of the pawl 29 axially outward from the engagement position of the pawl 29 and the engagement teeth 28A.

Further, maximum outer dimension D4 formed by the projecting flange 142 and the mechanism-side flange portion 132 is set larger than inner peripheral diameter D1 defined by tip ends of the engagement teeth 28A on the inner periphery of the through hole 28 formed in the side wall portion 21. Therefore, even if the reactive force for locking the engagement claw 29A of the pawl 29 and the engagement teeth 28A causes the mechanism-side flange portion 132 to depart from the pawl 29 and get contact with the engagement teeth 28A, the projecting flange 142 can stay at the position to face the engagement teeth 28A. Thereby, the above configuration can surely prevent significant misalignment of the pawl 29 axially outward from the engagement position of the pawl 29 and the engagement teeth 28A.

Even if rigidity is sacrificed for weight reduction of the take-up drum 105 and the housing 15, the projecting flange 142 projecting from the mechanism-side flange portion 132 can easily be made high in projection height so as to surely prevent significant misalignment of the pawl 29 axially outward from the engagement position of the pawl 29 and the engagement teeth 28A. Even if there is applied the take-up drum 105 a load working toward the pawl 29 with respect to axial direction, the projecting flange 142 projecting from the mechanism-side flange portion 132 shoulders the load while abutting on the engagement teeth 29. Thus, degree of load the pawl 29 has to shoulder can be reduced. Further, the number of pawls can be minimized to only the one pawl 29 at the mechanism-side flange portion 132 positioned so as to face the engagement teeth 28A and the number of components thus can be reduced.

Even if the lock mechanism 10 stops the take-up drum 105 from rotating in the webbing-pull-out direction and the webbing 3 applies the take-up drum 105 a load working toward the pawl 29 with respect to axial direction so that the take-up drum 105 consequently gets misaligned toward the pawl 29 with respect to axial direction, the mechanism can get the stepped portions 143 each swelling up axially outward from the projecting flange 142 to abut on the engagement teeth 28A. Therefore, even if the take-up drum 105 gets misaligned toward the pawl 29 with respect to axial direction, a clearance for allowing the pawl 29 to move is secured between the engagement teeth 28A and the projecting flange 142. Thereby, the stepped portions 143 can help stay the pawl 29 closer to the projecting flange 142 than the engagement teeth 28A with respect to axial direction and the engagement of the pawl 29 and the engagement teeth 28A can be secured.

Even if the lock mechanism 10 stops the take-up drum 105 from rotating in the webbing pull-out direction and the webbing 3 applies the take-up drum 105 a load working in direction departing from the pawl 29 with respect to axial direction, the displacement prevention flange 141 arranged at an axially outer peripheral edge portion of the mechanism-side flange portion 132 is positioned such that its axially inner surface faces the engagement teeth 28 for misalignment prevention of the mechanism-side flange portion 132. Thereby, the displacement prevention flange 141 can surely prevent significant misalignment of the pawl 29 axially inward from the engagement position of the pawl 29 and the engagement teeth 28A.

Even if the lock mechanism 10 stops the take-up drum 105 from rotating in the webbing-pull-out direction and the webbing 3 applies the take-up drum 105 a load working in direction departing from the pawl 29 with respect to axial direction so that the take-up drum 105 consequently gets misaligned in direction departing from the pawl 29 with respect to axial direction, the mechanism can make the outer stepped portions 145 each swelling up axially inward from the displacement prevention flange 141 abut on the engagement teeth 28A. Therefore, even if the take-up drum 105 gets misaligned so as to depart from the pawl 29 with respect to axial direction, a clearance for allowing the pawl 29 to move is secured between the engagement teeth 28A and the displacement prevention flange 141. Thereby, the outer stepped portions 145 can help stay the pawl 29 closer to the displacement prevention flange 141 than the engagement teeth 28A with respect to axial direction and the engagement of the pawl 29 and the engagement teeth 28A can be secured.

According to the above description, owing to the projecting flange 142 and the displacement prevention flange 141 formed on the mechanism-side flange portion 132, even if the webbing 3 applies the take-up drum 105 a load toward either of sides with respect to axial direction, the mechanism-side flange portion 132 alone can surely prevent significant misalignment of the pawl 29 in either one of sides with respect to axial direction from the engagement position of the pawl 29 and the engagement teeth 28A. Accordingly, arrangement of the projecting flange 142 and the displacement prevention flange 141 on the mechanism-side flange portion 132 can reduce damages to the housing 15 due to sacrifice in rigidity thereof and easily achieve weight reduction of the housing 15.

Further, in the side wall portion 22, there is formed the through hole 38 consisting of the semicircular opening portion 36 and the enlarged opening portion 37. The enlarged opening portion 37 is formed in a substantially U-shape so as to extend downward and slightly widen outward from both lower end portions of the semicircular opening portion 36. When the projecting flange 142 is inserted into the housing 15 from the through hole 28 by inclining the take-up drum unit 6 with the take-up-spring-side flange portion 133 down and the mechanism-side flange portion 132 up, the outer flange 147 and the take-up-spring-side flange portion 133 both inclined downward can be inserted into the through hole 38 in the side wall portion 22 from its communicating part of the semicircular opening portion 36 and the enlarged opening portion 37. Thereby, the take-up drum unit 6 can easily be settled between the side wall portions 21 and 22 and the efficiency in assembly work can be improved.

Even if the lock mechanism 10 stops the take-up drum 105 from rotating in the webbing-pull-out direction and the webbing 3 applies the take-up drum 105 a load working in direction departing from the pawl 29 with respect to axial direction, the take-up-spring-side flange portion 133 is positioned such that its axially outer surface faces an inner side surface of the semicircular opening portion 36. Thereby, the take-up-spring-side flange portion 133 can help prevent significant misalignment of the pawl 29 axially inward from the engagement position of the pawl 29 and the engagement teeth 28A.

Even if the lock mechanism 10 stops the take-up drum 105 from rotating in the webbing pull-out direction and the webbing 3 applies the take-up drum 105 a load working in direction toward the pawl 29 with respect to axial direction, the outer flange 147 formed on axial outer side of the take-up-spring-side flange portion 133 is positioned such that its axially inner surface faces outer side surfaces of the V-shaped projections 39 of the semicircular opening portion 36. Thereby, the outer flange 147 can help prevent significant misalignment of the pawl 29 axially outward from the engagement position of the pawl 29 and the engagement teeth 28A.

The present invention is not limited to the above-described embodiment, but various improvements and alterations can be made thereto without departing from the spirit of the present invention. The following alternations may be made, for instance.

It is to be noted that in the following description, reference numbers identical with those used for referring to constituent elements of the seatbelt retractor 1 directed to the above described embodiment shown in FIG. 1 through 32 stand for the constituent elements identical or substantially equivalent with those of the seatbelt retractor directed to the above described embodiment.

(A) For instance, although two of the inner stepped portions 143 are arranged at both sides on the axially outer surface of the projecting flange 142 in the embodiment, the projecting flange 142 may include only one inner stepped portion 143 at either one of the both sides exterior to both sides of the opening portion for pawl's exit formed in the pawl housing concave portion 137. In similar with the inner stepped portions 143, although two of the outer stepped portions 145 are arranged at both sides on the axially inner surface of the displacement prevention flange 141 in the embodiment, the displacement prevention flange 141 may include only one outer stepped portion 145 at either one of the both sides exterior to the both sides of the opening portion for pawl's exit formed in the pawl housing concave portion 137. In the above case, the single inner stepped portion 143 and the single outer stepped portion 145 may be arranged in a face-to-face manner or a non-face-to-face manner, whichever, at either one of their respective both sides exterior to both sides of the opening portion for the pawl's exit formed in the pawl housing concave portion 137.

Thereby, whichever side the take-up drum 105 may get misaligned with respect to axial direction, the single inner stepped portion 143 swelling up axially outward from the projecting flange 142 or the single outer stepped portion 145 swelling up axially inward from the displacement prevention flange 145 can abut on the engagement teeth 28A. Accordingly, whichever side the take-up drum 105 may get misaligned with respect to the axial direction, a clearance for allowing the pawl 29 to move is secured between the engagement teeth 28A and the projecting flange 142 or between the engagement teeth 28A and the displacement prevention flange 145 so that the pawl 29 can stay closer to the projecting flange 142 or closer to the displacement prevention flange 145 than the engagement teeth 28A with respect to axial direction. Thereby, the engagement of the pawl 29 and the engagement teeth 28A can be secured.

Figure 33:
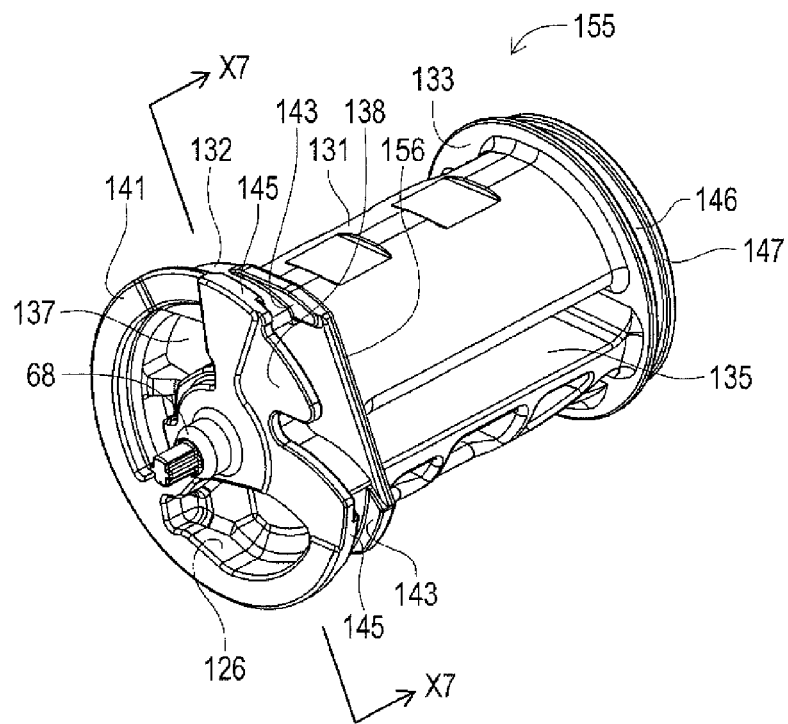
FIG. 33 is a perspective view showing an outer appearance of a seatbelt retractor according to another embodiment.
Figure 34:
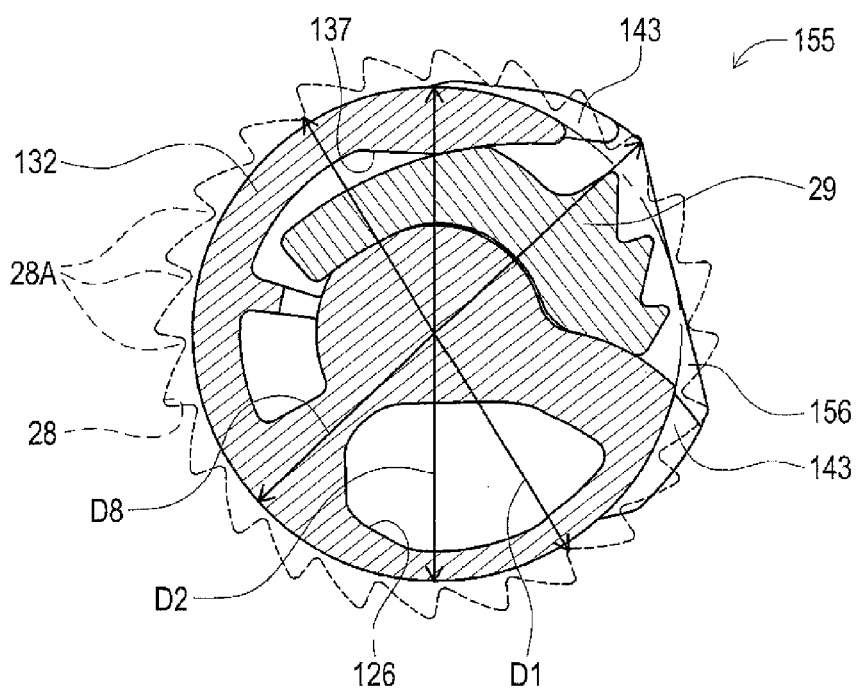
FIG. 34 is a cross sectional view taken along arrow X7-X7 in FIG. 33 illustrating a state where the pawl is inserted.

(B) For instance, instead of the take-up drum 105, a take-up drum 155 as shown in FIG. 33 and FIG. 34 may be placed in the take-up drum unit 6. FIG. 33 is a perspective view of the take-up drum 155. FIG. 34 is a cross sectional view taken along arrow X7-X7 in FIG. 33 illustrating a state where the pawl 29 is inserted.

As shown in FIG. 33 and FIG. 34, the take-up drum 155 is almost the same as the take-up drum 105 in configuration but different in adaptation of a projecting flange 156 instead of the projecting flange 142.

For weight reduction of the take-up drum 155, the projecting flange 156 is shaped so as to have a liner edged portion connecting vicinities of both of the stepped portions 143, whereby degree of projection at radially outer periphery thereof is lessened. Further, maximum outer dimension D8 formed by the projecting flange 156 and the mechanism-side flange portion 132 is set larger than inner peripheral diameter D1 defined by tip ends of the engagement teeth 28A on the inner periphery of the through hole 28 formed in the side wall portion 21. Accordingly, in a state where rotation axis of the take-up drum 155 and center axis 28B of the through hole 28 in the side wall portion 21 align, the projecting flange 156 is positioned so that its axially outer surface faces the engagement teeth 28A and both edges at radially outer periphery thereof are configured to project radially outward over the inner peripheral diameter D1 defined by tip ends of the engagement teeth 28A Thus, the projecting flange 156 is formed so as to project radially outward from the mechanism-side flange portion 132 and the both edges at radially outer periphery of the projecting flange 156 are positioned so that their respective axially outer surfaces face the engagement teeth 28A. Thereby, even if activation of the lock mechanism 10 stops the take-up drum 156 from rotating in the webbing-pull out direction and the webbing 3 applies the take-up drum 156 a load working toward the pawl 29 with respect to axial direction, the both edges at radially outer periphery of the projecting flange 156 face the engagement teeth 28. Thereby, the thus configured projecting flange 156 can surely prevent significant misalignment of the pawl 29 axially outward from the engagement position of the pawl 29 and the engagement teeth 28A.

Further, maximum outer dimension D8 formed by the projecting flange 156 and the mechanism-side flange portion 132 is set larger than inner peripheral diameter D1 defined by tip ends of the engagement teeth 28A on the inner periphery of the through hole 28 formed in the side wall portion 21. Therefore, even if the reactive force for locking the engagement claw 29A of the pawl 29 and the engagement teeth 28A causes the mechanism-side flange portion 132 to depart from the pawl 29 and get contact with the engagement teeth 28A, the both edges at radially outer periphery of the projecting flange 156 can stay at the position to face the engagement teeth 28A. Thereby, the above configuration can surely prevent significant misalignment of the pawl 29 axially outward from an engagement position of the pawl 29 and the engagement teeth 28A.

Even if the lock mechanism 10 stops the take-up drum 155 from rotating in the webbing-pull-out direction and the webbing 3 applies the take-up drum 155 a load working toward the pawl 29 with respect to axial direction so that the take-up drum 155 consequently gets misaligned toward pawl 29 with respect to axial direction, the mechanism can get the stepped portions 143 each swelling up axially outward from the projecting flange 156 to abut on the engagement teeth 28A. Therefore, even if the take-up drum 155 gets misaligned toward the pawl 29 with respect to axial direction, a clearance for allowing the pawl 29 to move is secured between the engagement teeth 28A and the projecting flange 156. Thereby, the stepped portions 143 can help stay the pawl 29 closer to the projecting flange 156 than the engagement teeth 28A with respect to axial direction and the engagement of the pawl 29 and the engagement teeth 28A can be secured.

The invention claimed is:

1. A seatbelt retractor comprising:
a housing having a pair of side wall portions which face each other, a through-hole formed in each of the side wall portions;
a take-up drum rotatably mounted between the pair of side wall portions and in the housing, the take-up drum with both ends inserted into respective through-holes, and taking up a webbing with one end of the webbing fixed in a webbing take-up portion thereof, and urged to rotate in a webbing take-up direction by a take-up urging member; and
a locking means configured to stop the take-up drum from rotating in a webbing-pull-out direction during an emergency of a vehicle,
wherein the take-up drum includes a flange portion formed in a circular shape concentrically with a rotation axis of the take-up drum and inserted into the through hole of one of the pair of side wall portions,
wherein the locking means comprises:
engagement teeth formed as internal teeth on inner periphery of the through hole at the one side wall portion; and
a pawl movably disposed in a concave portion recessed radially inward in the flange portion of the take-up drum and including engagement claws as external teeth and being capable of engaging with the engagement teeth of the through hole, the pawl being capable of moving between a disengagement position to be disengaged with the engagement teeth and an engagement position to be engaged with the engagement teeth during the emergency of the vehicle;
wherein a peripheral edge of the flange portion has an inner projecting portion projecting radially outward therefrom and located inside of the one side wall portion, the inner projecting portion being arranged adjacent to the engagement claws of the pawl in a rotation axis direction of the take-up drum, and the engagement claws of the pawl being capable of facing the inner projecting portion when the pawl is engaged with the engagement teeth, and the peripheral edge of the flange portion has an outer projecting portion projecting radially outward therefrom, and located outside of the one side wall portion and located adjacent to the concave portion of the flange portion,
wherein a maximum outer peripheral dimension formed by the inner projecting portion and the flange portion in a radial direction is made larger than an inner peripheral diameter of tip ends of the engagement teeth of the through hole,
wherein an outer diameter formed by the outer projecting portion and the flange portion is made larger than the inner peripheral diameter of tip ends of the engagement teeth of the through hole,
wherein, in a state where the through hole at the one side wall portion and the rotation axis of the take-up drum are concentric, the inner projecting portion and the outer projecting portion of the flange portion each projects radially outward beyond the inner peripheral diameter of tip ends of the engagement teeth of the through hole, and
wherein, in a state where the take-up drum is moved in a radial direction by a reaction force due to an engagement of the pawl with the engagement teeth of the through hole, and a periphery of the flange portion is in contact with a part of the engagement teeth on the radially opposite side from where the pawl engages with the engagement teeth, the inner projecting portion and the outer projecting portion project radially outward beyond the inner peripheral diameter of tip ends of the engagement teeth where the pawl engages with the engagement teeth.

* * * * *